US011463716B2

(12) United States Patent
Matsuba et al.

(10) Patent No.: US 11,463,716 B2
(45) Date of Patent: Oct. 4, 2022

(54) BUFFERS FOR VIDEO CODING IN PALETTE MODE

(71) Applicant: QUALCOMM Incorporated, San Diego, CA (US)

(72) Inventors: Yasutomo Matsuba, San Diego, CA (US); David Chu, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/185,093

(22) Filed: Feb. 25, 2021

(65) Prior Publication Data

US 2022/0272367 A1    Aug. 25, 2022

(51) Int. Cl.
| | |
|---|---|
| H04N 19/176 | (2014.01) |
| H04N 19/105 | (2014.01) |
| H04N 19/423 | (2014.01) |
| H04N 19/91  | (2014.01) |
| H04N 19/157 | (2014.01) |
| H04N 19/186 | (2014.01) |
| H04N 19/93  | (2014.01) |

(52) U.S. Cl.
CPC ......... *H04N 19/423* (2014.11); *H04N 19/105* (2014.11); *H04N 19/157* (2014.11); *H04N 19/176* (2014.11); *H04N 19/186* (2014.11); *H04N 19/91* (2014.11)

(58) Field of Classification Search
CPC .. H04N 19/423; H04N 19/105; H04N 19/157; H04N 19/176; H04N 19/186; H04N 19/91
USPC .................................................. 375/240.24
See application file for complete search history.

(56) References Cited

U.S. PATENT DOCUMENTS

| | | | |
|---|---|---|---|
| 5,774,110 A | 6/1998 | Edelson | |
| 2005/0259743 A1 | 11/2005 | Payson | |

(Continued)

FOREIGN PATENT DOCUMENTS

| | | | | |
|---|---|---|---|---|
| CN | 113497935 A | * | 10/2021 | |
| WO | WO-2020243399 A1 | * | 12/2020 | ........... H04N 19/119 |
| WO | WO-2021195628 A1 | * | 9/2021 | |

OTHER PUBLICATIONS

ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.

(Continued)

*Primary Examiner* — Albert Kir
(74) *Attorney, Agent, or Firm* — Shumaker & Sieffert, P.A.

(57) ABSTRACT

An example apparatus includes a first line buffer and a second line buffer, where each memory location in the first line buffer and the second line buffer corresponds to a row or column of a palette token block. The first line buffer may store two of the neighboring palette token values (e.g., above and left palette token values), and the second line buffer may store one of the neighboring palette token value (e.g., above-left). As a video coder is coding palette token values, the video coder may shift values stored in the first line buffer to the overwrite a memory location in the second line buffer, and overwrite values stored in the first line buffer based in part on the row or column of the palette token block to which the memory locations in the first and second line buffer correspond.

31 Claims, 11 Drawing Sheets

(56) References Cited

U.S. PATENT DOCUMENTS

| | | | |
|---|---|---|---|
| 2015/0016501 A1* | 1/2015 | Guo | H04N 19/93 375/240.02 |
| 2015/0084968 A1 | 3/2015 | Cheng et al. | |
| 2015/0146976 A1 | 5/2015 | Ma et al. | |
| 2016/0057434 A1* | 2/2016 | Lai | H04N 19/182 382/233 |
| 2017/0195676 A1* | 7/2017 | Chuang | H04N 19/157 |
| 2018/0152714 A1* | 5/2018 | Sun | H04N 19/186 |
| 2018/0288415 A1* | 10/2018 | Li | H04N 19/13 |
| 2019/0116380 A1* | 4/2019 | Chuang | H04N 19/426 |
| 2021/0058613 A1* | 2/2021 | Alakuijala | H04N 19/176 |
| 2022/0086464 A1* | 3/2022 | Jhu | H04N 19/129 |

OTHER PUBLICATIONS

International Search Report and Written Opinion—PCT/US2022/013527—ISA/EPO—dated Apr. 25, 2022 (13 pp).

\* cited by examiner

BUFFERS FOR VIDEO CODING IN PALETTE MODE

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice or a video tile (e.g., a video picture or a portion of a video picture) may be partitioned into video blocks, which may also be referred to as coding blocks, superblocks, coding tree units (CTUs), coding units (CUs) and/or coding nodes. Video blocks in an intra coded (I) slice of a picture are encoded using spatial prediction with respect to reference samples (also called prediction samples) in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for reducing the amount of memory that is reserved for palette mode coding. In palette mode coding, a video coder (e.g., video encoder or video decoder) may generate a palette token block that includes a plurality of palette token values. Each palette token value is an index into a list of palette colors for a palette predictor block used for palette mode coding a current block.

The palette token values may be entropy coded and neighboring palette token values may be contexts used to determine the probability for coding a current palette token value. This disclosure describes example techniques to reduce the overall amount of memory that is needed for entropy coding the palette token values, while ensuring that the neighboring palette token values used as contexts for determining probability for coding a current palette token value is available.

For example, this disclosure describes a first line buffer and a second line buffer, where each memory location in the first line buffer and the second line buffer corresponds to a row or column of the palette token block. The first line buffer and the second line buffer may be one-dimensional buffers (e.g., an array of memory locations).

The first line buffer may store two of the neighboring palette token values (e.g., above and left palette token values), and the second line buffer may store one of the neighboring palette token value (e.g., above-left). As the video coder is coding palette token values, the video coder may shift values stored in the first line buffer to the overwrite a memory location in the second line buffer, and overwrite values stored in the first line buffer based in part on the row or column of the palette token block to which the memory locations in the first and second line buffer correspond. In this way, the amount of memory used for storing neighboring palette token values may be reduced, as compared to techniques that store all palette token value for the entire palette token block for entropy coding.

In one example, this disclosure describes an apparatus configured to code video data includes a first line buffer, reserved in memory, configured to store a first palette token value of a first neighboring palette token to a current palette token of a palette token block of a current block in a first location of the first line buffer and configured to store a second palette token value of a second neighboring palette token to the current palette token of the palette token block of the current block in a second location of the first line buffer; a second line buffer, reserved in the memory, configured to store a third palette token value of a third neighboring palette token to the current palette token of the palette token block of the current block in a third location of the second line buffer, wherein the first palette token value, the second palette token value, and the third palette token value are each an index into a list of palette colors for a palette predictor block used for palette mode coding the current block; and one or more processors implemented in circuitry and in communication with the first line buffer and the second line buffer, the one or more processors configured to: access the first palette token value and the second palette token value from the first line buffer and the third token value from the second line buffer; and arithmetic code a current palette token value for the current palette token based on the first palette token value, the second palette token value, and the third palette token value.

In another example, this disclosure describes a method of coding video data includes storing, in a first line buffer reserved in memory, a first palette token value of a first neighboring palette token to a current palette token of a palette token block of a current block in a first location of the first line buffer and a second palette token value of a second neighboring palette token to the current palette token of the palette token block of the current block in a second location of the first line buffer; storing, in a second line buffer reserved in the memory, a third palette token value of a third neighboring palette token to the current palette token of the palette token block of the current block in a third location of the second line buffer, wherein the first palette token value, the second palette token value, and the third palette token value are each an index into a list of palette colors for a palette predictor block used for palette mode coding the current block; accessing the first palette token value and the second palette token value from the first line buffer and the third token value from the second line buffer; and arithmetic coding a current palette token value for the current palette token based on the first palette token value, the second palette token value, and the third palette token value.

In another example, this disclosure describes a device of coding video data includes means for storing, in a first line buffer reserved in memory, a first palette token value of a first neighboring palette token to a current palette token of a palette token block of a current block in a first location of the first line buffer and configured to store a second palette token value of a second neighboring palette token to the current palette token of the palette token block of the current block in a second location of the first line buffer; means for storing, in a second line buffer reserved in the memory, a third palette token value of a third neighboring palette token to the current palette token of the palette token block of the current block in a third location of the second line buffer, wherein the first palette token value, the second palette token value, and the third palette token value are each an index into a list of palette colors for a palette predictor block used for palette mode coding the current block; means for accessing the first palette token value and the second palette token value from the first line buffer and the third token value from the second line buffer; and means for arithmetic coding the current palette token value for the current palette token based on the first palette token value, the second palette token value, and the third palette token value.

In another example, this disclosure describes a computer-readable storage medium storing instructions thereon that when executed cause one or more processors to: store, in a first line buffer reserved in memory, a first palette token value of a first neighboring palette token to a current palette token of a palette token block of a current block in a first location of the first line buffer and configured to store a second palette token value of a second neighboring palette token to the current palette token of the palette token block of the current block in a second location of the first line buffer; store, in a second line buffer reserved in the memory, a third palette token value of a third neighboring palette token to the current palette token of the palette token block of the current block in a third location of the second line buffer, wherein the first palette token value, the second palette token value, and the third palette token value are each an index into a list of palette colors for a palette predictor block used for palette mode coding the current block; access the first palette token value and the second palette token value from the first line buffer and the third token value from the second line buffer; and arithmetic code the current palette token value for the current palette token based on the first palette token value, the second palette token value, and the third palette token value.

The details of one or more examples are set forth in the accompanying drawings and the description below. Other features, objects, and advantages will be apparent from the description, drawings, and claims.

DETAILED DESCRIPTION

Figure 1:
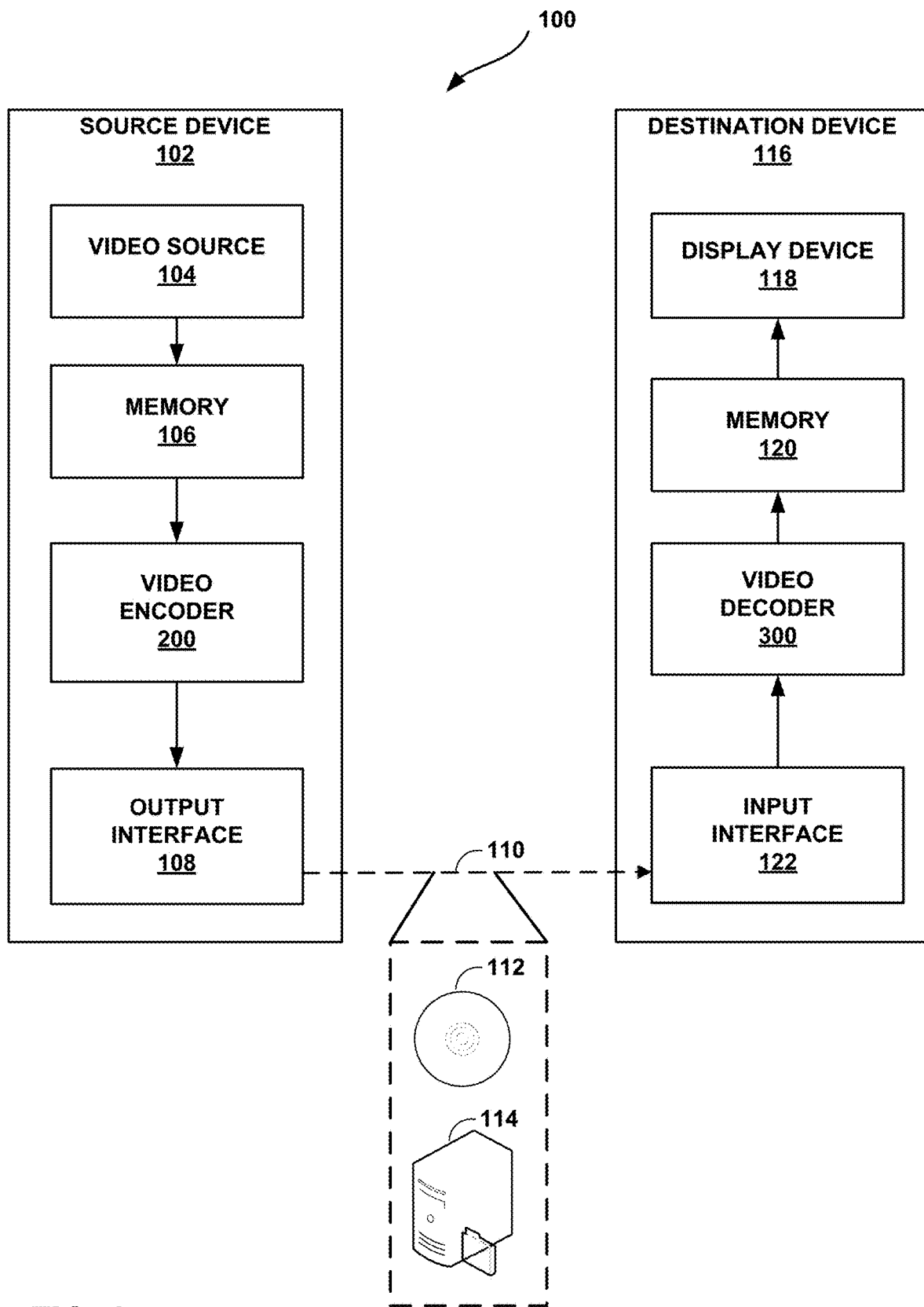
FIG. 1 is a block diagram illustrating an example video encoding and decoding system that may perform the techniques of this disclosure.

Palette mode coding is an example of video coding in which a video encoder generates a list of palette colors (e.g., list of color values), and generates a predictor block for a current block based on the color values. For instance, the predictor block may include a plurality of predictor values that each correspond to a sample of the current block. The predictor values may be one of the color values of the palette (e.g., the color value of the palette that is closest to the actual sample value of a sample of the current block). The video encoder may determine a residual (e.g., difference) between the current block and the predictor block, and signal information indicative of the residual.

In addition, the video encoder may generate a palette token block for the predictor block. The palette token block includes a plurality of palette token values, where each palette token value corresponds to a predictor value in the predictor block. The palette token value may be an index to the list of palette colors that identifies the corresponding predictor value. As an example, assume there are eight color values in the list of palette colors. The first color value is identified by index 0 in the list of palette colors, the second color value is identified by index 1 in the list of palette colors, and so forth. A predictor value in the predictor block may be equal to one of the color values in the list of palette colors. Assume that a first predictor value of the predictor block has a color value equal to the color value in the list of palette colors with index 2. In this example, the video encoder may assign a palette token value in the palette token block, which corresponds to the first predictor value in the predictor block, a value of 2.

The video encoder may encode the palette token block and encode the list of palette colors. The video decoder may decode and reconstruct the palette token block and the list of palette colors. With the palette token block and the list of palette colors, the video decoder may reconstruct the predictor block. The video decoder may also generate the residual information indicative of the difference between the current block and the predictor block based on the information signaled by the video encoder. The video decoder may reconstruct the current block based on the predictor block and the residual.

As described above, the video encoder and the video decoder may encode and decode the palette token block. One example way in which to encode and decode the palette token block is based on arithmetic coding, such as entropy coding. In some examples of arithmetic coding, a video coder (e.g., video encoder or video decoder) determines probabilities for coding bits based on context values of one or more contexts. For instance, for coding (e.g., encoding or decoding) the palette token block, the video coder may determine one or more probabilities for coding a current palette token value based on one or more neighboring palette token values (e.g., above, left, and above-left palette token values). In this example, the palette tokens that neighbor the current palette token of the palette token block are contexts and the neighboring palette token values of the neighboring palette tokens are the context values.

This disclosure describes example techniques to reduce the amount of memory that is reserved for storing neighboring palette token values used for arithmetic coding, as compared to some other techniques. For instance, in some techniques, for decoding of palette token values, the video decoder may reserve memory to store all palette token values for a palette token block as the palette token values are decoded. To ensure sufficiently fast decoding, the decoded palette token values may be stored in memory that can be written to or read from quickly, such as registers or L1 cache. However, reserving memory that can be written to or read from quickly can have negative impact, especially if a large portion of such memory is reserved. For instance, if the palette token block can have a size of 64×64 and each palette token value can have four bits, then 16,384 bits (i.e., 64×64×4) would need to be reserved in fast accessible memory, which may limit the number of bits in the fast accessible memory that are available for other processes.

In some examples, the fast accessible memory (e.g., registers or L1 cache) may be needed for palette token value coding because the arithmetic coding process may require multiple clock cycles and any delay in accessing memory may further increase the coding time for the palette token values. Once the palette token values are decoded, it may be possible, but not required, to store the decoded palette token values in memory that does not need to be accessed quickly. For instance, as described above, for coding a current palette token value, the video coder may utilize neighboring palette token values. Accordingly, for coding the current palette token value, the fast accessible memory may need to store the neighboring palette token values.

In accordance with techniques described in this disclosure, the video coder may reserve memory for a first line buffer and a second line buffer. The first line buffer and the second line buffer may be one-dimensional buffers. In some examples, the first line buffer and the second line buffer may be one-dimensional buffers formed in one double buffer, or may be portions of a larger line buffer. Each memory location in the first line buffer and the second line buffer may correspond to a row or column of the palette token block.

For coding a current palette token value of a current palette token of the palette token block, the video coder may access the first line buffer, at a first location, for a first neighboring palette token value (e.g., above palette token value) and access the first line buffer, at a second location, for a second neighboring palette token value (e.g., left palette token value) based on the memory locations in the first line buffer that correspond to the row or column of the first neighboring palette token and the second neighboring palette token. The video coder may access the second line buffer, at a third location, for a third neighboring palette token value (e.g., above-left palette token value) based on the memory location in the second line buffer that corresponds to the row or column of the third neighboring palette token.

After coding the current palette token value, the video coder may update the first and second line buffers. For instance, the video coder may store the first palette token value, stored in the first location of the first line buffer, into the third location of the second line buffer overwriting the third palette token value, and store a previous palette token value into the first location of the first line buffer overwriting the first palette token value. The video coder may also store current palette token value in the second location of the first line buffer overwriting the second palette token value.

In this way, rather than storing all palette token values in memory for arithmetic coding palette token values, this disclosure describes example techniques for storing palette token values that will be needed for arithmetic coding, but overwriting palette token values that are no longer needed for arithmetic coding. For instance, rather than reserving 64×64×4 bits, it may be possible to reserve 64×4 bits for the first line buffer and 64×4 bits for the second line buffer for a total of 64×2×4 bits, which may be a 97% reduction in amount of memory that needs to be reserved for arithmetic coding of palette token values in examples where 64×64×4 bits were needed to be reserved (e.g., 64×2×4 is 3% of 64×64×4).

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for reserving memory for video coding in palette mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for reserving memory for video coding in palette mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

In some examples of the disclosure, video encoder 200 and video decoder 300 may operate according to a video coding format, such as AOMedia Video 1 (AV1) or extensions thereto, as well as successor coding formats (e.g., AV2) that may currently be in development or will be forthcoming. In other examples, video encoder 200 and video decoder 300 may operate according to other proprietary or industry standards. The techniques of this disclosure, however, are not limited to any particular coding standard and/or video coding format. In general, video encoder 200 and video decoder 300 may be configured to perform the techniques of this disclosure in conjunction with any video coding techniques that use memory for storing context values of contexts used for arithmetic coding. For ease of description, the examples are described with respect to arithmetic coding for palette token blocks used in palette mode coding.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

This disclosure may use "N×N" and "N by N" interchangeably to refer to the sample dimensions of a block (such as a coding block, superblock, or other block of video data) in terms of vertical and horizontal dimensions, e.g., 16×16 samples or 16 by 16 samples. In general, a 16×16 coding block will have 16 samples in a vertical direction (y=16) and 16 samples in a horizontal direction (x=16). Likewise, an N×N coding block generally has N samples in a vertical direction and N samples in a horizontal direction, where N represents a nonnegative integer value. The samples in a coding block may be arranged in rows and columns. Moreover, coding blocks need not necessarily have the same number of samples in the horizontal direction as in the vertical direction (i.e., the coding block may be non-square). For example, coding blocks may comprise N×M samples, where M is not necessarily equal to N.

When operating according to the AV1 codec, video encoder 200 and video decoder 300 may be configure to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of the block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding enables parallel processing and multi-threading for encoder and decoder implementations.

In some examples, a coding block includes a coding bock of luma samples and two coding blocks of corresponding chroma samples for a picture that has three sample arrays. In other examples, a coding block comprises a single coding block of luma samples (e.g., for a monochrome picture). AV1 supports 4:0:0 chroma subsampling (e.g., monochrome), 4:2:0 chroma subsampling, 4:2:2 chroma subsampling, and 4:4:4 chroma subsampling (i.e., no chroma subsampling). AV1 may code video data in a YUV color space where Y is a luma component, U is a first chroma component (e.g., blue projection), and V is a second chroma component (e.g., red projection).

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

The difference between the currently encoded samples and predicted values generated from the reference samples is called a residual. Video encoder 200 may encode the residual values (e.g., through transformation, quantization, and entropy coding) in an encoded video bitstream. Video decoder 300 may decode the residual values, determine predicted values generated from the reference samples in the same manner as video encoder 200, and add the predicted values generated from reference samples to the residuals to reconstruct the coding block The intra prediction modes of AV1 include directional intra prediction, non-directional smooth intra prediction, recursive filter intra prediction, chroma from luma (CFL) prediction, intra block copy, and color palette modes. Video encoder 200 may encode syntax elements that indicate the intra prediction mode used to video decoder 300.

Video encoder 200 may generally form a prediction block for the coding block using one of the aforementioned inter prediction modes or intra prediction modes (e.g., excluding color palette mode). In general, video encoder 200 subtracts the value of the sample of the coding block from a prediction sample determined according to one of the intra prediction modes or inter prediction modes to determine a residual block. Video decoder 300 performs the inverse of this operation. Video decoder 300 determines the prediction samples in the same manner as video encoder 200, but adds the decoded residual to the prediction sample to reconstruct the coding block.

To encode a block using directional intra prediction, video encoder 200 may determine particular directional intra prediction mode to determine the prediction samples. AV1 provides fifty-six directional intra prediction modes. When encoding a coding block using directional intra prediction, video encoder 200 uses a directional predictor that projects each sample of the coding block to a prediction sample location. The prediction sample location may be a sub-pixel location (e.g., between samples). In such a case, video encoder may use interpolation (e.g., a 2-tap bilinear filter) to determine the value of the prediction sample.

In non-directional smooth intra prediction, video encoder 200 may determine prediction samples according to a DC prediction mode, a Paeth prediction mode, or by using one of three smooth predictors. In DC prediction mode, video encoder 200 predicts samples of a block from the average of available neighboring reference samples. In Paeth prediction mode, video encoder 200 uses one of a top reference sample, left reference sample, or top-left edge reference sample which has a value closest to (top+left−topleft). Video encoder 200 may determine the three smooth predictors using quadratic interpolation in a horizontal direction, a vertical direction, or the average of the interpolations in the horizontal and vertical directions.

Video encoder 200 may determine to use recursive filter intra prediction in situations where there is reduced spatial correlation between samples of the coding blocks and prediction samples at the edges of coding blocks. To perform recursive intra prediction, video encoder 200 may determine one of five filter intra modes. Each of the five intra modes are defined by a set of 7-tap filters that specify a correlation between samples in a 4×2 sub-block and seven adjacent neighboring samples. Video encoder 200 may determine one of five types of intra filter modes at the block level and predict samples in 4×2 sub-blocks.

Video encoder 200 may determine to use chroma from luma (CFL) to predict chroma samples from corresponding reconstructed luma samples. In particular, video encoder 200 may use sums of reconstructed luma samples in 2×2 sub-blocks of a luma block minus the average luma sample value of the block, as well as DC prediction samples for the chroma block, to determine a final prediction sample for predicting the chroma samples. The sums of reconstructed luma samples in 2×2 sub-blocks of a luma block minus the average luma sample value of the block represent an "AC" contribution from the luma block.

In intra block copy mode, video encoder 200 and video decoder 300 may predict a coding block using a previously-reconstructed coding block as a reference block, where the reference block is in the same frame as the currently coded coding block. Video encoder 200 may indicate a location of the previously-reconstructed coding block using a displacement vector (e.g., an x and y displacement from the currently coded coding block). Intra block copy mode is similar to a translational inter prediction mode, but rather than using a reference block in another frame, the intra block copy mode uses a reference block from the same frame. Intra block copy mode may be particularly useful for so-called "screen content" video frames that may include text, characters, and/or repeated textures (e.g., such as video displaying the contents of a computer screen).

In each of the aforementioned intra prediction modes, video encoder 200 may generate a residual block by subtracting the sample values of a currently coded block from prediction pixels generated in accordance with one of the intra prediction modes. Color palette mode (also referred to as palette mode coding or simply palette mode) is considered another type of intra prediction mode, as color palette mode does not use predicted samples generated from reference samples values. Color palette mode may be useful for frames of video data with a limited number of unique colors (e.g., screen content).

In color palette mode, video encoder 200 and video decoder 300 may generate a palette predictor block (e.g., prediction block) based on a color palette and the sample/pixel value of each sample or pixel in the coding block. For example, the color palette may be a list of palette colors. For each location in the palette predictor block, video encoder 200 may assign a palette color from the list palette colors (e.g., assign a palette color that is closest to the corresponding sample value in the coding block). For instance, each prediction sample in the palette predictor block corresponds to a sample in the coding block. Video encoder 200 may determine palette color from the list of palette colors that is closest to a sample in the coding block, and assign the determined palette color to the prediction sample in the palette predictor block.

Video encoder 200 may determine residual values between the palette predictor block and the coding block, and encode and signal information indicative of the residual values. Video encoder 200 may also encode and signal the list of palette colors.

In some examples, in addition to the residual values and the list of palette colors, video encoder 200 may construct a palette token block. The palette token block includes a plurality of palette token values, and each of the palette token values may be an index into the list of palette colors that identifies the palette color for a prediction sample in the palette predictor block. For example, if the palette predictor block is 16×16, then the palette token block may be 16×16. If the palette color for the first prediction sample in the predictor block is identified by index 2 in the list of palette colors, then video encoder 200 may assign the first palette token value in the palette token block with the value of 2 to indicate that the value for the first prediction sample in the predictor block is located at index 2 in the list of palette colors. Video encoder 200 may encode and signal the palette token block.

Video decoder 300 may receive the information for the palette token block, the list of palette colors, and the residual values. Video decoder 300 may reconstruct the palette token block based on the signaled information. Video decoder 300 may reconstruct the palette predictor block based on the palette token block and the list of palette colors. For example, video decoder 300 may determine that the value of the prediction sample in the first location of the palette predictor block is at index 2 in the list of palette colors. Video decoder 300 may access index 2 in the list of palette colors and assign the color value in the list of palette colors at index 2 as the value of the first prediction sample in the palette predictor block. Video decoder 300 may repeat such operations for reconstructing the palette predictor block. Video decoder 300 may add the palette predictor block with the residual values to reconstruct the current block.

When predicting blocks of a current frame of video data using an inter prediction mode, video encoder 200 and video decoder 300 may use video data from one or more reference frames of video data. Video encoder 200 may encode sample values based on the differences (e.g., the residuals) between sample values of a current block to be coded and prediction samples within a different frame (e.g., a reference frame). The reference frame may be before or after the currently coded frame in presentation order. Video encoder 200 may determine the prediction samples and reference frame based on the inter prediction mode.

Like for intra prediction modes, video encoder 200 may encode the residual values (e.g., through transformation, quantization, and entropy coding) in an encoded video bitstream. Video decoder 300 may decode the residual values, determine the prediction block in the same manner as video encoder 200, and add the prediction block to the residuals to reconstruct the coding block. Video encoder 200 may determine a particular inter prediction mode from among a plurality of inter prediction modes that provides the best rate-distortion cost. Video encoder 200 may encode the mode information, residual values (e.g., the difference between a current sample and a prediction sample), and other block characteristics in an encoded video bitstream. The inter prediction modes of AV1 include translational motion compensation, affine motion compensation (e.g., warped motion compensation), overlapped block motion compensation (OBMC), and compound inter-intra predictor modes.

For translational motion compensation, video encoder 200 may generate the prediction block (e.g., the block including the prediction samples) using one or more motion vectors. Video encoder 200 may generally perform a motion search to identify a reference block that closely matches the coding block, e.g., in terms of differences between the samples of the coding block and the prediction samples of the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current coding block using uni-directional prediction or bi-directional prediction.

Video encoder 200 may also encode the motion vector(s) using a prediction method. For example, video encoder 200 may encode motion vectors with reference to other candidate motion vectors, including spatial motion vectors (e.g., motion vectors of neighboring blocks encoded using inter prediction) or temporal motion vectors (e.g., motion vectors from co-located blocks in other pictures coded using inter prediction). The candidate motion vectors may be added to a dynamic motion vector reference list.

AV1 also provide an affine motion compensation mode. In affine motion compensation mode, video encoder 200 may determine the warping parameters to warp the reference block to get the prediction using neighboring candidates' motion vectors. The warping parameters represent non-translational or affine motion, such as zoom in or out, rotation, perspective motion, or other irregular motion types.

Video encoder 200 may use OBMC mode to decrease prediction errors near block edges. In OBMC mode, video encoder 200 and video decoder 300 determines prediction samples using prediction samples generated based on motion vectors from the top neighboring block and/or the left neighboring block. Video encoder 200 and video decoder 300 may generate the final prediction samples by combining such prediction samples using smoothing filters.

In compound inter-intra predictor mode, video encoder 200 and video decoder 300 may form a prediction sample using both inter prediction and intra prediction techniques. Two prediction samples may be combined using weighting coefficients.

When performing a prediction process, such as intra prediction or inter prediction of a block, video encoder 200 may calculate residual data for the block. The residual data, such as a residual block, represents sample by sample differences between the block and prediction samples for the block, formed using the corresponding prediction mode. Video encoder 200 may apply one or more transforms to the residual block, to produce transformed data in a transform domain instead of the sample domain. For example, video encoder 200 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may entropy encode syntax elements, including syntax element indicating the value of quantized transform coefficients. As another example, video encoder 200 may entropy encode prediction syntax elements (e.g., motion information for inter prediction or intra mode information for intra prediction). In accordance with AV1, video encoder 200 may be configured to perform entropy encoding using a symbol-to-symbol adaptive multi-symbol arithmetic coder. A syntax element in AV1 includes an alphabet of N elements, and a context (e.g., probability model) includes a set of N probabilities. Video encoder 200 may store the probabilities as 15 bit cumulative distribution functions (CDFs). Video encoder 200 may perform recursive scaling, with an update factor based on the alphabet size, to update the contexts.

In this manner, video encoder 200 may generate a bitstream including encoded video data, e.g., syntax elements describing partitioning of a picture into blocks (e.g., superblocks and coding blocks) and prediction modes and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using entropy decoding in a manner substantially similar to, albeit reciprocal to, the entropy encoding process of video encoder 200. The syntax elements may define partitioning information for partitioning of a picture into superblocks and coding blocks. The syntax elements may further define prediction and residual information for blocks (e.g., coding blocks) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (e.g., an intra or inter prediction mode) and related prediction information (e.g., motion information for inter prediction) to form a prediction samples for the block. Video decoder 300 may then combine the prediction samples and the corresponding sample values of the residual block (on a sample-by-sample basis) to reproduce the original block. Video decoder 300 may perform additional processing, such as performing a loop filtering process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, for palette mode coding, video encoder 200 may generate a palette token block that includes a plurality of palette token values for the palette tokens of the palette token block, and each palette token value may be an index into a list of palette colors. Video encoder 200 may encode the palette token values and video decoder 300 may decode the palette token values to reconstruct the palette token block.

To encode or decode the palette token values, video encoder 200 and video decoder 300 may utilize arithmetic coding, such as entropy coding. In some examples of arithmetic coding, video encoder 200 and video decoder 300 may determine context values for one or more contexts used for determining one or more probability values for coding bits. For coding palette token values, the contexts may be neighboring palette tokens in the palette token block, and the context values may be the palette token values of the neighboring palette tokens (i.e., neighboring palette token values).

This disclosure describes examples techniques for reducing the amount of memory that needs to be reserved for storing palette token values so that palette token values that are needed or will be needed for coding remain in memory, but palette token values that are no longer needed can be discarded from memory. For example, video encoder 200 and video decoder 300 may each include a first line buffer and a second line buffer. The first line buffer and the second line buffer may be separate line buffers or may be integrated into a double buffer. In some examples, the first line buffer and the second line buffer may be two portions of a larger line buffer.

The first line buffer may be configured to store a first palette token value of a first neighboring palette token (e.g., above palette token) to a current palette token of a palette token block of a current block in a first location of the first line buffer and configured to store a second palette token value of a second neighboring palette token (e.g., left palette token) to the current palette token of the palette token block of the current block in a second location of the first line buffer. The second line buffer may be configured to store a third palette token value of a third neighboring palette token (e.g., above-left palette token) to the current palette token of the palette token block of the current block in a third location of the second line buffer. The first palette token value, the second palette token value, and the third palette token value are each an index into a list of palette colors for a palette predictor block used for palette mode coding the current block.

The first location and the second location in the first buffer, and the third location in the second buffer may be based on a position of the neighboring palette token. For example, the first line buffer includes a plurality of memory locations that each correspond to a row or a column of the palette token block, and the second line buffer includes a plurality of memory locations that each correspond to the row or the column of the palette token block. As an example, if the current palette token is located in row N of the palette token block, then the first location in the first buffer that stores the first palette token value of the above palette token may be located at position N−1 in the first line buffer because the above palette token is in a row above the current palette token. In this example, the second location in the first buffer that stores the second palette token value of the left palette may be located at position N in the first line buffer because the left palette token is in the same row as the current palette token. The third location in the second buffer that stores the third palette token value of the above-left palette may be located at position N−1 in the second line buffer because the above-left palette token is in a row above the current palette token.

Video encoder 200 and video decoder 300 may be configured to access the first palette token value and the second palette token value from the first line buffer and the third token value from the second line buffer, and perform arithmetic coding on a current palette token value for the current palette token based on the first palette token value, the second palette token value, and the third palette token value. For example, video encoder 200 and video decoder 300 may be configured to determine one or more probability values for arithmetic coding the current palette token value based on the first palette token value, the second palette token value, and the third palette token value, and arithmetic code (e.g., encode or decode) the current palette token value based on the determined one or more probability values.

Video encoder 200 and video decoder 300 may also update the first line buffer and the second line buffer. For instance, subsequent to accessing the first palette token value and the second palette token value from the first line buffer and the third token value from the second line buffer, video encoder 200 and video decoder 300 may store the first palette token value, stored in the first location of the first line buffer, into the third location of the second line buffer overwriting the third palette token value, and store a previous palette token value into the first location of the first line buffer overwriting the first palette token value. After encoding or decoding the current palette token value, video encoder 200 and video decoder 300 may store the current palette token value in the second location of the first line buffer.

By overwriting the line buffers as described in this disclosure, the amount of memory that is reserved to store neighboring palette token values is reduced because not all palette token values need to be stored for coding. For instance, for 64×64 sized palette token block, it may be possible to reserve a first line buffer with 64 memory locations and a second line buffer with 64 memory locations, rather than reserving 64×64 memory locations.

In some examples, arithmetic coding tends to utilize many clock cycles and can be a bottleneck in coding. Accordingly, the memory that stores the palette token values for coding may be relatively fast accessible memory. With the reduced amount of memory that is reserved, the palette token values can still be stored in the fast accessible memory while ensuring that there is memory space available in the fast accessible memory for other processes.

Figure 2:
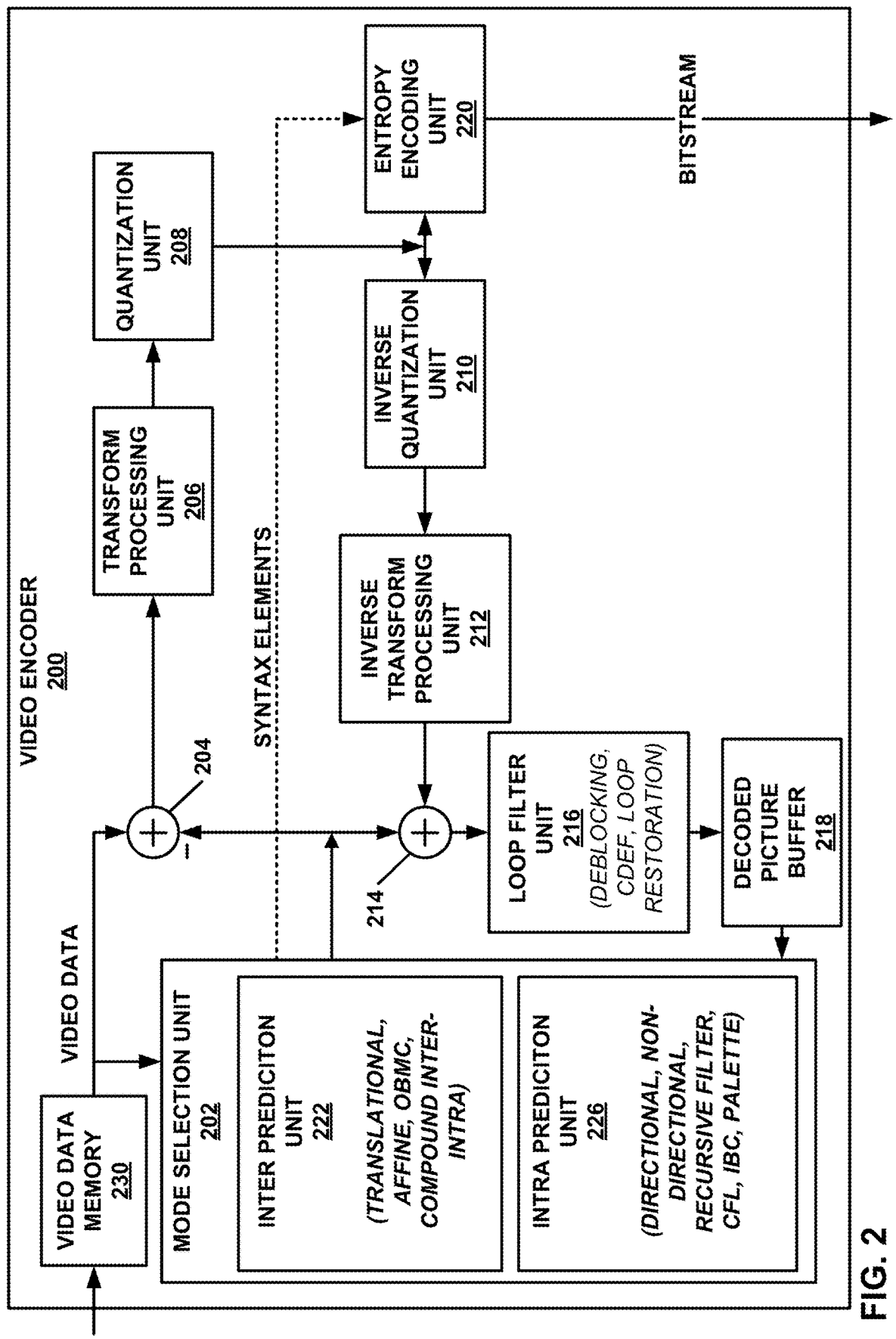
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of the AV1 coding format. However, the techniques of this disclosure may be performed by video encoding devices that are configured to encode video data according to other video coding formats and/or various video coding standards.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, loop filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, loop filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200. For example, as will be explained below, video data memory 230 may include a first buffer and a second buffer for storing the sums and averages of reconstructed luma sample values for CFL prediction.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture/frame of the video data from video data memory 230 and provide the video data to residual generation unit 204 and mode selection unit 202. Video data in video data memory 230 may be raw video data that is to be encoded.

Mode selection unit 202 includes inter prediction unit 222 and intra prediction unit 226. Inter prediction unit 222 may be configured to encode coding blocks of video data (e.g., both luma and chroma coding blocks) using translational motion compensation, affine motion compensation, OBMC, and/or compound inter-intra prediction, as described above. Intra prediction unit 226 may be configured to encode coding blocks of video data (e.g., both luma and chroma coding blocks) using directional intra prediction, non-directional intra prediction, recursive filter intra prediction, CFL, intra block copy (IBC), and/or color palette mode, as described above. Mode selection unit 202 may include additional functional units to perform video prediction in accordance with other prediction modes.

Mode selection unit 202 generally coordinates multiple encoding passes to test combinations of encoding parameters and resulting rate-distortion values for such combinations. The encoding parameters may include partitioning of superblocks into coding blocks, prediction modes for the coding blocks, transform types for residual data of the coding blocks, quantization parameters for residual data of the coding blocks, and so on. Mode selection unit 202 may ultimately select the combination of encoding parameters having rate-distortion values that are better than the other tested combinations.

Video encoder 200 may partition a picture retrieved from video data memory 230 into a series of coding blocks, and encapsulate one or more superblocks within tile. Mode selection unit 202 may partition superblocks of the picture in accordance with a tree structure.

In general, mode selection unit 202 also controls the components thereof (e.g., inter prediction unit 222 and intra prediction unit 226) to generate prediction samples for a current coding block. For example, for translational inter prediction of a current block, inter prediction unit 222 may perform a motion search to identify one or more closely matching reference blocks in one or more reference pictures (e.g., one or more previously coded pictures stored in DPB 218).

In particular, inter prediction unit 222 may calculate a value representative of how similar a potential reference block is to the current block, e.g., according to sum of absolute difference (SAD), sum of squared differences (SSD), mean absolute difference (MAD), mean squared differences (MSD), or the like. Inter prediction unit 222 may generally perform these calculations using sample-by-sample differences between the current block and the reference block being considered. Inter prediction unit 222 may identify a reference block having a lowest value resulting from these calculations, indicating a reference block that most closely matches the current block.

For translational inter prediction, inter prediction unit 222 may form one or more motion vectors (MVs) that defines the positions of the reference blocks in the reference pictures relative to the position of the current block in a current picture. For example, for uni-directional inter prediction, inter prediction unit 222 may determine a single motion vector, whereas for bi-directional inter prediction, inter prediction unit 222 may determine two motion vectors.

Inter prediction unit 222 may then generate a prediction block of prediction samples using the motion vectors. For example, inter prediction unit 222 may retrieve data of the reference block using the motion vector. As another example, if the motion vector has fractional sample precision, inter prediction unit 222 may interpolate values for the prediction block according to one or more interpolation filters. Moreover, for bi-directional inter prediction, inter prediction unit 222 may retrieve data for two reference blocks identified by respective motion vectors and combine the retrieved data, e.g., through sample-by-sample averaging or weighted averaging.

As another example, for intra prediction, intra prediction unit 226 may generate the prediction samples from samples in the same picture as the current block. In some examples, intra prediction unit 226 may generate prediction samples from reference samples that neighbor the current block. For example, for directional intra prediction modes, intra prediction unit 226 may generally mathematically combine values of neighboring samples and use these calculated values in the defined direction across the current block as the prediction block. As another example, for the non-directional DC mode, intra prediction unit 226 may calculate an average of the neighboring samples to the current block to generate the prediction samples.

For other video coding techniques such as an intra block copy mode, affine motion compensation, recursive filter intra prediction, and other prediction modes, as some examples, inter prediction unit 222 or intra prediction unit 226 generates prediction samples in accordance with the techniques of the particular coding mode being used. In some examples, such as color palette mode coding, intra prediction unit 226 may generate prediction samples of a prediction block (e.g., palette predictor block) but the prediction samples may not be based on reference samples. Rather, the prediction samples may be based on a list of palette colors, where each prediction sample of the palette predictor block is one of the color values of the list of palette colors. Intra prediction unit 226 may generate the palette predictor block based on the list of palette colors and determine residual values between the palette predictor block and the coding block.

Mode selection unit 202 provides the prediction samples to residual generation unit 204. Residual generation unit 204 receives a raw, unencoded version of the current block from video data memory 230 and the prediction samples from mode selection unit 202. Residual generation unit 204 calculates sample-by-sample differences between the current block and the prediction samples. The resulting sample-by-sample differences define a residual block for the current block. In some examples, residual generation unit 204 may be formed using one or more subtractor circuits that perform binary subtraction.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current coding block. Video encoder 200 (e.g., via mode selection unit 202) may adjust the degree of quantization applied to the transform coefficient blocks associated with the current block by adjusting the QP value associated with the coding block. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current coding block (albeit potentially with some degree of distortion) based on the reconstructed residual block and the prediction samples generated by mode selection unit 202. For example, reconstruction unit 214 may add samples of the reconstructed residual block to corresponding prediction samples generated by mode selection unit 202 to produce the reconstructed block.

Loop filter unit 216 may perform one or more filter operations on reconstructed blocks. For example, loop filter unit 216 may perform deblocking operations to reduce blockiness artifacts along edges of CUs. In other examples, loop filter unit 216 may apply a constrained directional enhancement filter (CDEF), which may be applied after deblocking, and may include the application of non-separable non-linear low-pass directional filters based on estimated edge directions. Loop filter unit 216 may also include a loop restoration filter, which is applied after CDEF, and may include a separable symmetric normalized Wiener filter or a dual self-guided filter. Operations of loop filter unit 216 may be skipped, in some examples.

Video encoder 200 stores reconstructed blocks in DPB 218. For instance, in examples where operations of loop filter unit 216 are not performed, reconstruction unit 214 may store reconstructed blocks to DPB 218. In examples where operations of loop filter unit 216 are performed, loop filter unit 216 may store the filtered reconstructed blocks to DPB 218. Inter prediction unit 222 may retrieve a reference picture from DPB 218, formed from the reconstructed (and potentially filtered) blocks, to inter predict blocks of subsequently encoded pictures. In addition, intra prediction unit 226 may use reconstructed blocks in DPB 218 of a current picture to intra predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter prediction or intra mode information for intra prediction) from mode selection unit 202.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as 15 bit cumulative distribution functions (CDFs). Entropy encoding unit 220 may perform recursive scaling, with an update factor based on the alphabet size, to update the contexts.

Video encoder 200 may output an encoded video bitstream that includes the entropy encoded syntax elements needed to reconstruct blocks of a slice or picture. For example, entropy encoding unit 220 may output the bitstream.

Video encoder 200 represents an example of a device configured to encode video data including a memory configured to store video data, and one or more processing units implemented in circuitry and configured to perform example techniques described in this disclosure. For example, video data memory 230, memory within entropy encoding unit 220, or some other memory that is fast accessible by entropy encoding unit 220 may include a first line buffer configured to store a first palette token value of a first neighboring palette token to a current palette token of a palette token block of a current block in a first location of the first line buffer and configured to store a second palette token value of a second neighboring palette token to the current palette token of the palette token block of the current block in a second location of the first line buffer, and include a second line buffer configured to store a third palette token value of a third neighboring palette token to the current palette token of the palette token block of the current block in a third location of the second line buffer. The first palette token value, the second palette token value, and the third palette token value are each an index into a list of palette colors for a palette predictor block used for palette mode coding the current block.

Entropy encoding unit 220 may access the first palette token value and the second palette token value from the first line buffer and the third token value from the second line buffer, and arithmetic encode a current palette token value for the current palette token based on the first palette token value, the second palette token value, and the third palette token value. For example, to arithmetic encode, entropy encoding unit 220 may be configured to determine one or more probability values for arithmetic coding the current palette token value based on the first palette token value, the second palette token value, and the third palette token value, and arithmetic encode the current palette token value based on the determined one or more probability values.

Intra prediction unit 226 may be configured to generate the palette predictor block. For instance, intra prediction unit 226 may determine a palette color in the list of palette colors that is closest to a first sample in the current block, and assign the determined palette color to a first sample in the palette predictor block that corresponds to the first sample in the current block. Intra prediction unit 226 may repeat such operations for all samples in the current block and in the palette predictor block.

Residual generation unit 204 may determine residual values between the current block and the palette predictor block. Entropy encoding unit 220 may also signal information indicative of the residual, in addition to a result of the arithmetic encoding of the palette token values of the palette token block.

Figure 3:
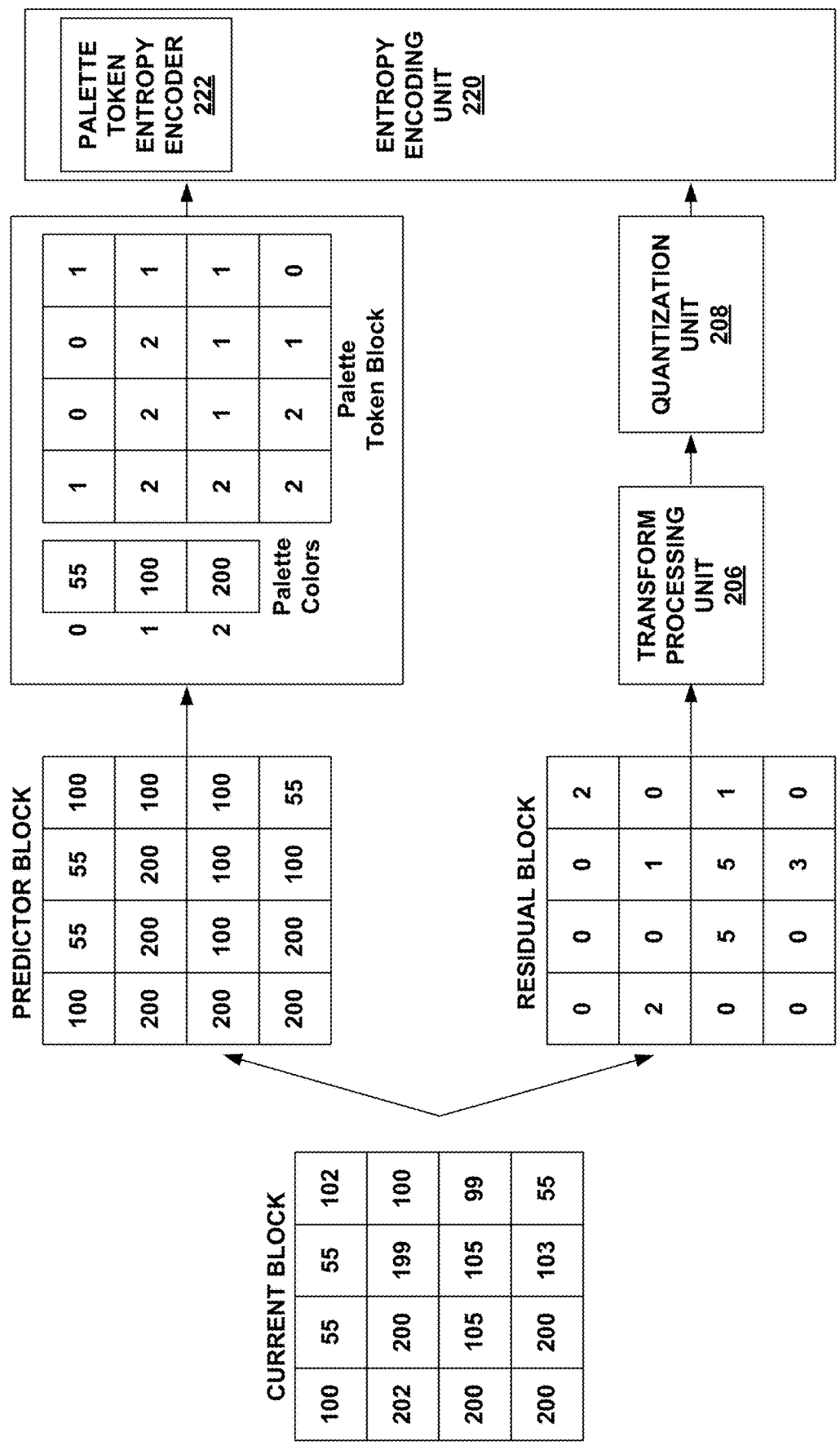
FIG. 3 is a conceptual diagram illustrating an example of generating and encoding a palette token block.

FIG. 3 is a conceptual diagram illustrating an example of generating and encoding a palette token block. In FIG. 3, the current block may include the sample values as illustrated. Intra prediction unit 226 may determine a list of palette colors. In the example of FIG. 3, the list of palette colors is 55, 100, and 200, where palette color 55 is identified by index 0, palette color 100 is identified by index 1, and palette color 200 is identified by index 2.

Intra prediction unit 226 may generate the palette predictor block as illustrated in FIG. 3. For example, the top-left sample in the current block is 100, which is closest to palette color 100, and therefore, the top-left prediction sample in the palette predictor block is 100. The top-right sample in the current block is 102, which is closest to palette color 100, and therefore, the top-right prediction sample in the palette predictor block is 100. The sample in the second row, third column of the current block is 199, which is closest to palette color 200, and therefore, the prediction sample in the second row, third column of the palette predictor block is 200.

Intra prediction unit 226 may determine a residual block (e.g., residual values) such as from subtracting the palette predictor block from the current block. Transform processing unit 206 may perform a transform, and quantization unit 208 may quantize the coefficients from the transform. Entropy encoding unit 220 may then encode the quantized, transformed residual values.

In addition, intra prediction unit 226 may generate a palette token table. The palette token table includes a plurality of palette token values that may be indices into the list of palette colors that identify the palette color that corresponds to a prediction sample. For example, the top-left prediction sample is 100, and index 1 of the list of palette colors identifies palette color 100. Therefore, the palette token value of the top-left palette token (e.g., top-left palette token value) of the palette token block is 1. The bottom-left prediction sample is 200, and index 2 of the list of palette colors identifies palette color 200. Therefore, the palette token value of the bottom-left palette token (e.g., bottom-left palette token value) of the palette token block is 2, and so forth.

Figure 6:
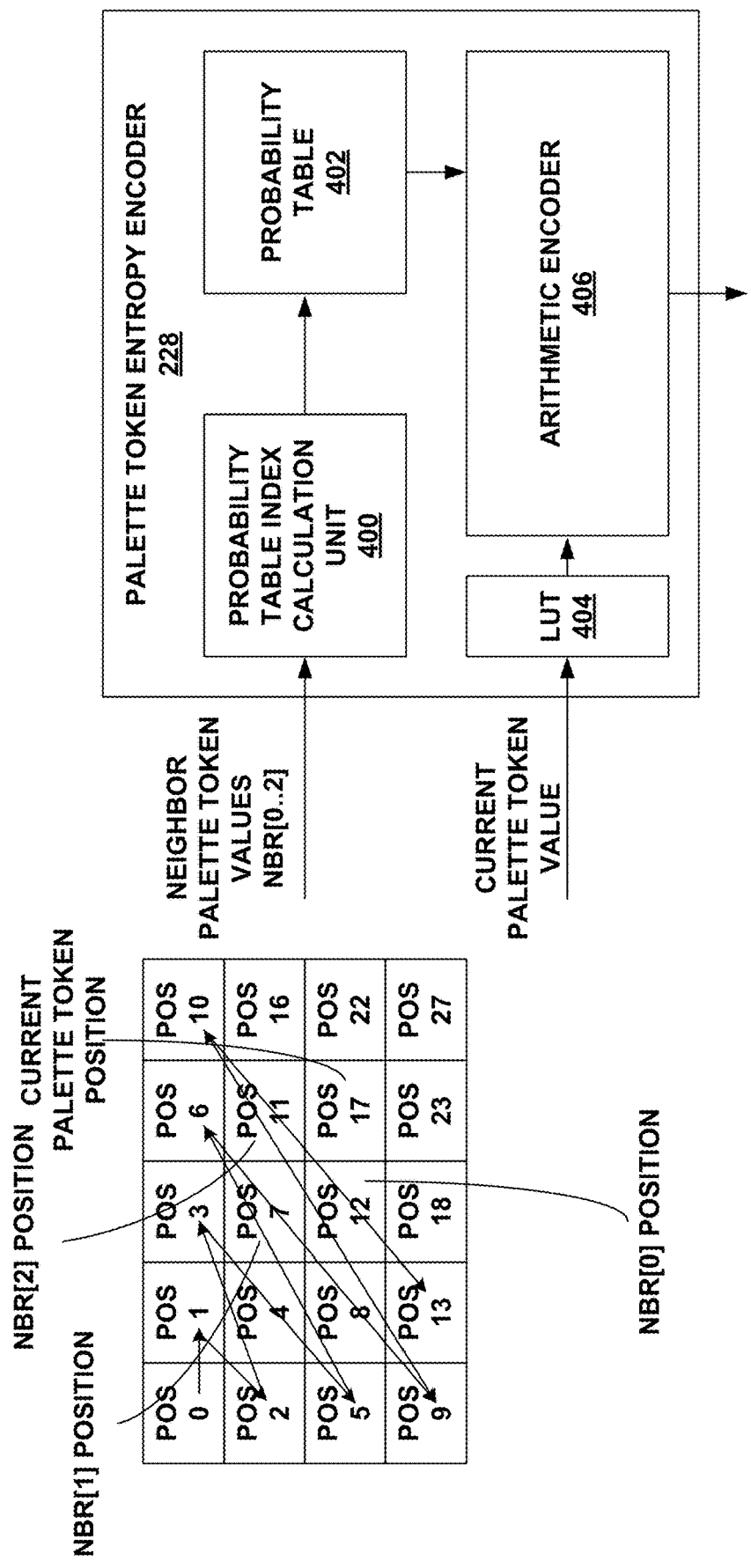
FIG. 6 is a block diagram illustrating an example of a palette token entropy encoder.

Palette token entropy encoder 228 may arithmetic encode the palette token values of the palette token block. An example of palette token entropy encoder 228 is illustrated in FIG. 6.

Figure 4:
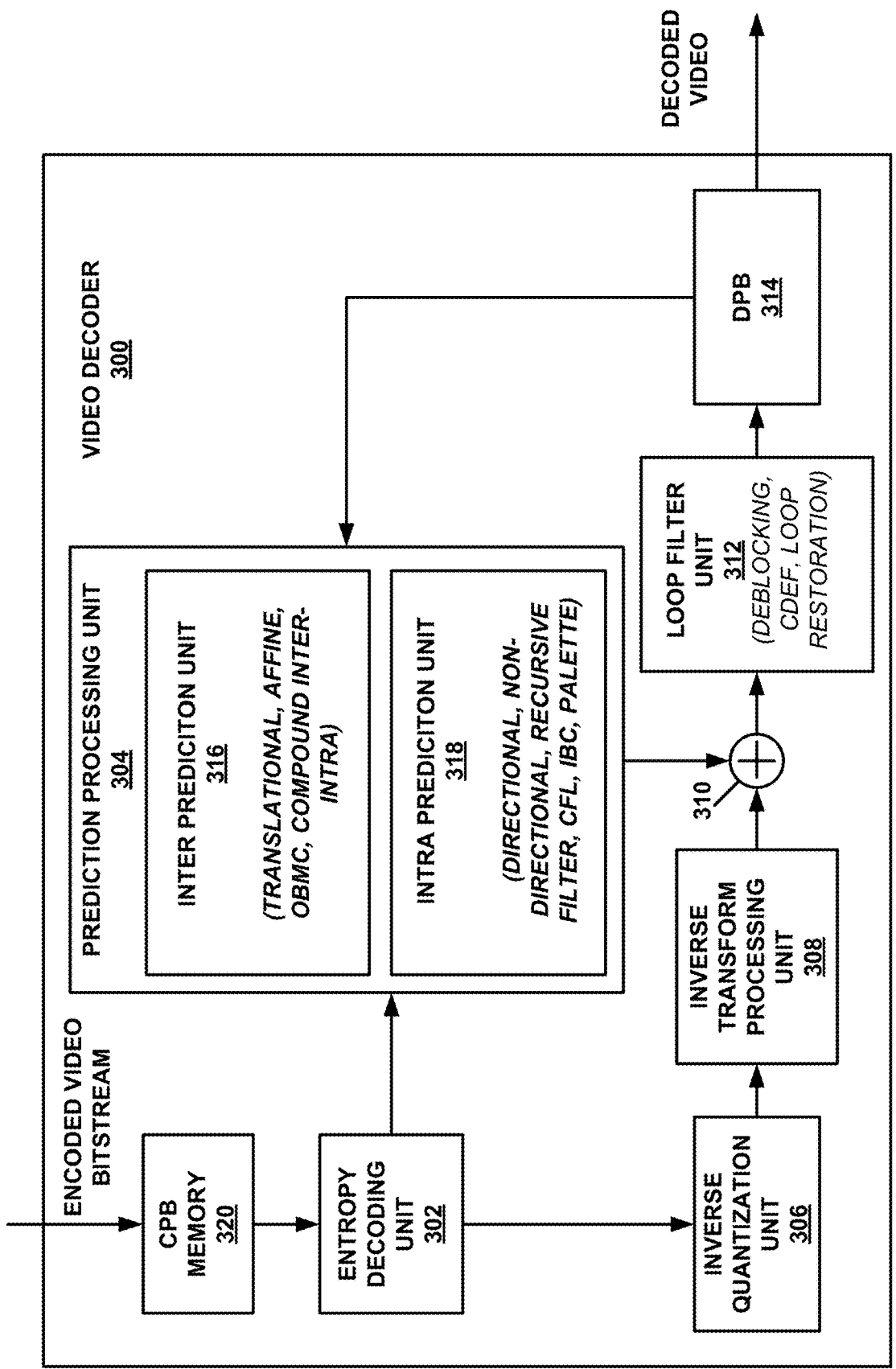
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of the AV1 video coding format. However, the techniques of this disclosure may be performed by video decoding devices that are configured to decode video data according to other video coding formats and/or various other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, loop filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, loop filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes inter prediction unit 316 and intra prediction unit 318. Inter prediction unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above. Prediction processing unit 304 may include additional functional units to perform video prediction in accordance with other prediction modes.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. For example, as will be explained below, CPB memory 320 may include a first buffer and a second buffer for storing the sums and averages of reconstructed luma sample values for CFL prediction.

DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from CPB memory 320 and entropy decodes the video data to reproduce syntax elements. Prediction processing unit 304, inverse quantization unit 306, inverse transform processing unit 308, reconstruction unit 310, and loop filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current coding block. For example, inverse transform processing unit 308 may apply a horizontal/vertical combination of an inverse DCT, inverse ADST, inverse flipped ADST, or an inverse identity transform.

Furthermore, prediction processing unit 304 generates prediction samples according to prediction information syntax elements that were entropy decoded by entropy decoding unit 302. For example, if the prediction information syntax elements indicate that the current block is inter predicted, inter prediction unit 316 may generate the prediction samples. In this case, the prediction information syntax elements may indicate a reference picture in DPB 314 from which to retrieve a reference block, as well as a motion vector identifying a location of the reference block in the reference picture relative to the location of the current block in the current picture. Inter prediction unit 316 may generally perform the inter prediction process in a manner that is substantially similar to that described with respect to inter prediction unit 222 (FIG. 2).

As another example, if the prediction information syntax elements indicate that the current block is intra predicted, intra prediction unit 318 may generate the prediction samples according to an intra prediction mode indicated by the prediction information syntax elements. Again, intra prediction unit 318 may generally perform the intra prediction process in a manner that is substantially similar to that described with respect to intra prediction unit 226 (FIG. 2). Intra prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding prediction samples to reconstruct the current block.

Loop filter unit 312 may perform one or more filter operations on reconstructed blocks. For example, loop filter unit 312 may perform deblocking operations to reduce blockiness artifacts along edges of the reconstructed blocks. In other examples, loop filter unit 312 may apply a constrained directional enhancement filter (CDEF), which may be applied after deblocking. and may include the application of non-separable non-linear low-pass directional filters based on estimated edge directions. Loop filter unit 312 may also include a loop restoration filter, which is applied after CDEF, and may include a separable symmetric normalized Wiener filter or a dual self-guided filter. Operations of loop filter unit 312 are not necessarily performed in all examples.

Video decoder 300 may store the reconstructed blocks in DPB 314. For instance, in examples where operations of loop filter unit 312 are not performed, reconstruction unit 310 may store reconstructed blocks to DPB 314. In examples where operations of loop filter unit 312 are performed, loop filter unit 312 may store the filtered reconstructed blocks to DPB 314. As discussed above, DPB 314 may provide reference information, such as samples of a current picture for intra prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform example techniques described in this disclosure. For example, CPB memory 320 or some other memory that is fast accessible by entropy decoding unit 302 may include a first line buffer configured to store a first palette token value of a first neighboring palette token to a current palette token of a palette token block of a current block in a first location of the first line buffer and configured to store a second palette token value of a second neighboring palette token to the current palette token of the palette token block of the current block in a second location of the first line buffer, and include a second line buffer configured to store a third palette token value of a third neighboring palette token to the current palette token of the palette token block of the current block in a third location of the second line buffer. The first palette token value, the second palette token value, and the third palette token value are each an index into a list of palette colors for a palette predictor block used for palette mode coding the current block.

Entropy decoding unit 302 may access the first palette token value and the second palette token value from the first line buffer and the third token value from the second line buffer, and arithmetic decode a current palette token value for the current palette token based on the first palette token value, the second palette token value, and the third palette token value. For example, to arithmetic decode, entropy decoding unit 302 may be configured to determine one or more probability values for arithmetic coding the current palette token value based on the first palette token value, the second palette token value, and the third palette token value, and arithmetic decode the current palette token value based on the determined one or more probability values.

Intra prediction unit 318 may be configured to generate the palette predictor block. For instance, intra prediction unit 318 may determine a list of palette colors as signaled by video encoder 200. Intra prediction unit 318 may also receive information for the palette token block. Based on the palette token block and the list of palette colors, intra prediction unit 318 may reconstruct the palette predictor block. For instance, intra prediction unit 318 may determine a palette token value for a top-left palette token in the palette token block. The palette token value may be an index into the list of palette colors. Intra prediction unit 318 may retrieve the palette color in the list of palette colors at the index, and assign the top-left prediction sample of the palette predictor block the retrieved palette color. Intra prediction unit 318 may repeat these operations to determine the other prediction samples of the palette predictor block to reconstruct the palette predictor block.

Reconstruction unit 310 may add the palette predictor block with the residual values outputted from inverse transform processing unit 308. In this way, video decoder 300 may reconstruct the current block.

Figure 5:
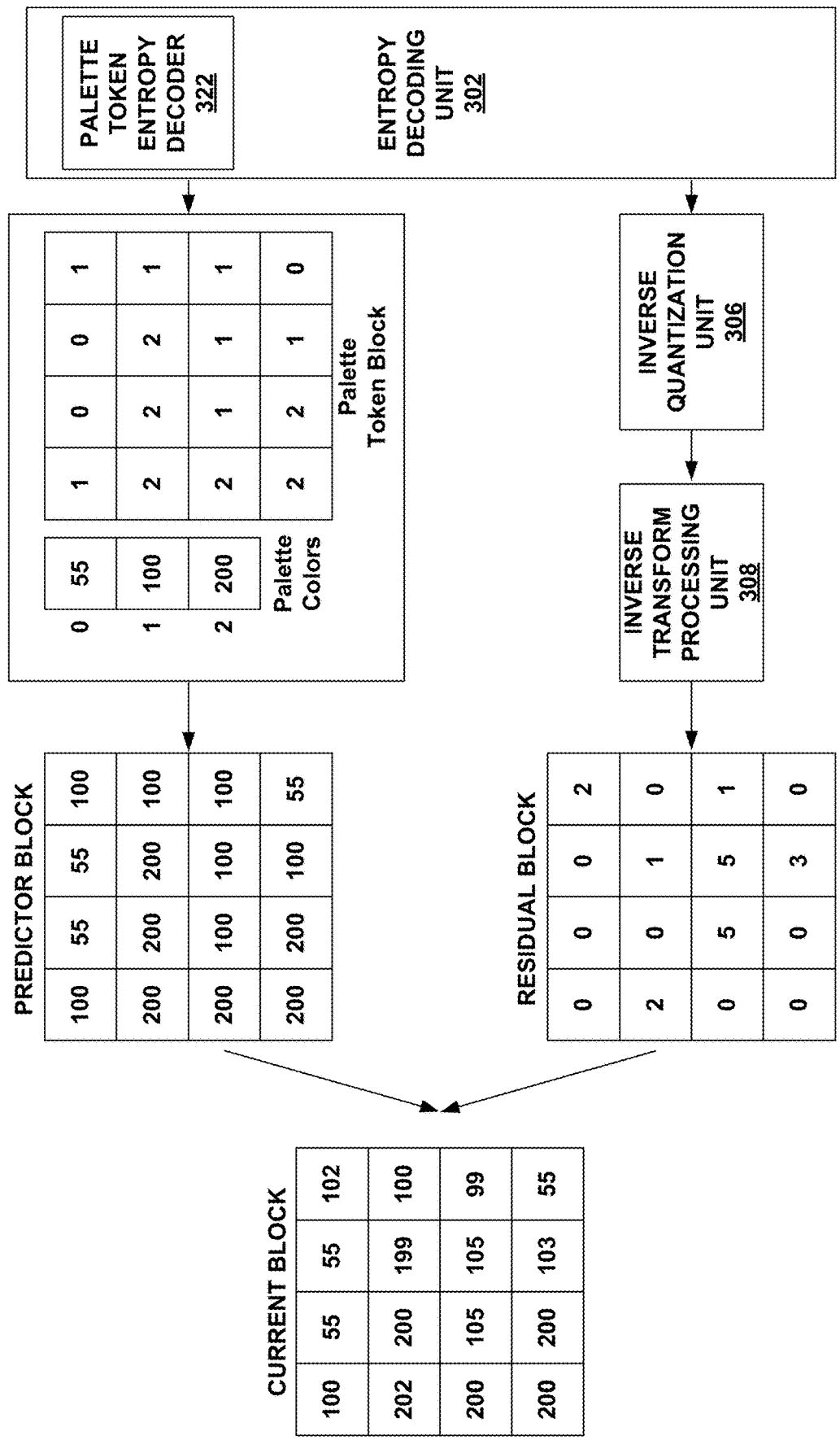
FIG. 5 is a conceptual diagram illustrating an example of generating and decoding a palette token block.

FIG. 5 is a conceptual diagram illustrating an example of generating and decoding a palette token block. FIG. 5 illustrates the reciprocal process as the example of FIG. 3. For instance, entropy decoding unit 302 may decode the residual values. Inverse quantization unit 306 may perform inverse quantization, and inverse transform unit 308 may perform inverse transform to generate the residual values of the residual block which may be the same or slightly different due to quantization being a lossy operation as the residual values that video encoder 200 signaled, as illustrated in FIG. 5.

Figure 7:
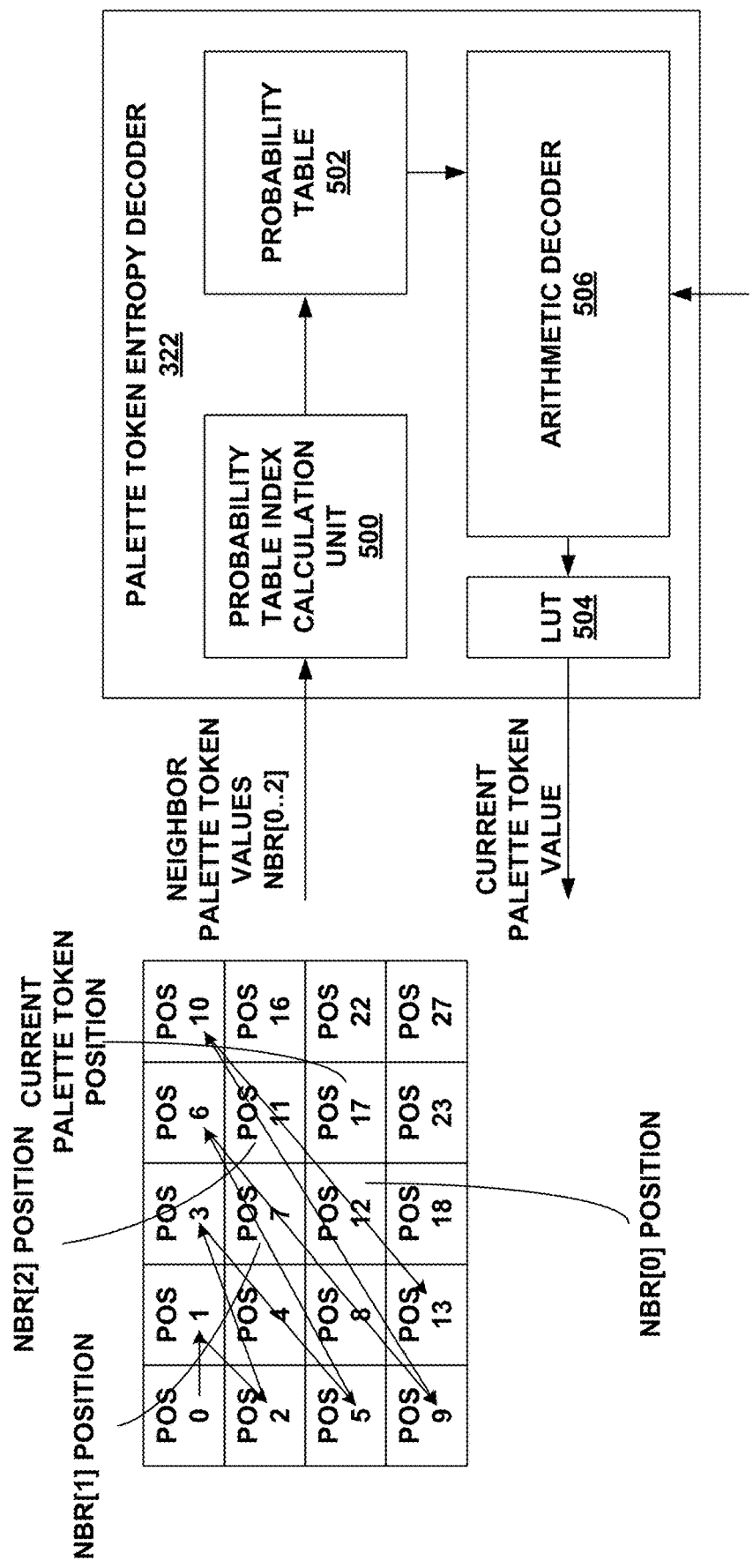
FIG. 7 is a block diagram illustrating an example of a palette token entropy decoder.

Palette token entropy decoder 322 may determine palette token values of a palette token block, as illustrated in FIG. 5. An example of palette token entropy decoder 322 is illustrated in FIG. 7. The palette token block illustrated in FIG. 5 may be the same as the palette token block illustrated in FIG. 3 with the same palette token values.

Intra prediction unit 318 may reconstruct the palette predictor block. For instance, the top-left palette prediction value is 1, which is an index into the list of palette colors. The index of 1 into the list of palette colors refers to palette color 100. Therefore, the top-left prediction sample in the palette predictor block is 100. The bottom-left palette prediction value is 2, which is an index into the list of palette colors. The index of 2 into the list of palette colors refers to palette color 200. Therefore, the bottom-left prediction sample in the palette predictor block is 200, and so forth.

Reconstruction unit 310 may add the palette predictor block with the residual values outputted from inverse transform processing unit 308. In this way, video decoder 300 may reconstruct the current block.

FIG. 6 is a block diagram illustrating an example of a palette token entropy encoder. Palette token entropy encoder 228 may include probability table index calculation unit 400, probability table 402, look up table (LUT) 404, and arithmetic encoder 406. FIG. 6 also illustrates a palette token block. However, rather than illustrating the palette token values, FIG. 6 illustrates the order in which the palette token values are encoded. For instance, the palette token value at position 0 is encoded first, followed by the palette token value at position 1, followed by the palette token value at position 2, and so forth. As illustrated, the encoding order for the palette token block is a diagonal scan order.

LUT 404 receives the current palette token value for the current palette token. In the example of FIG. 6, the current palette token is the palette token at position 17. LUT 404 determines a value based on the current palette token value that is output to arithmetic encoder 406.

Probability table index calculation unit 400 receives context values of contexts used of arithmetic encoding the current palette token value. For instance, the contexts may be the neighboring palette tokens and the context values may be the neighboring palette token values of the neighboring palette tokens. As illustrated, the neighboring palette tokens are NBR[0], NBR[1], and NBR[2]. NBR[0] may be the left neighboring palette token (e.g., palette token at position 12). NBR[1] may be the above-left neighboring palette token (e.g., palette token at position 7). NBR[2] may be the above neighboring palette token (e.g., palette token at position 11).

Probability table index calculation unit 400 may receive the palette token values for the left neighboring palette token, the above-left neighboring palette token, and the above neighboring palette token, and generate an index to probability table 402. Probability table 402 receives the index from probability table index calculation unit 400 and outputs one or more probability values to arithmetic encoder 406 for encoding the current palette token value.

In some examples, some of the operations for encoding the current palette token value may be occurring in parallel (e.g., overlapping in time) with operations for encoding the previous palette token value. As one example, while probability table index calculation unit 400 and probability table 402 are determining the one or more probabilities for encoding the current palette token value (e.g., palette token value for position 17), arithmetic encoder 406 may be encoding the previous palette token value (e.g., palette token value for position 16). Then, when arithmetic encoder 406 completes encoding the previous palette token value, arithmetic encoder 406 may encode the current palette token value. In parallel with arithmetic encoder 406 encoding the current palette token value, probability table index calculation unit 400 and probability table 402 may determine the probability values for the next palette token value (e.g., palette token value for position 18), and so forth.

In accordance with one or more examples described in this disclosure, probability table index calculation unit 400 may retrieve the palette token values for the palette token block from a first line buffer and a second line buffer. For instance, intra prediction unit 226 may store in a first line buffer, reserved in memory, a first neighboring palette token (e.g., above palette token) to a current palette token of a palette token block of a current block in a first location of the first line buffer and store a second palette token value of a second neighboring palette token (e.g., left palette token) to the current palette token of the palette token block of the current block in a second location of the first line buffer. Intra prediction unit 226 may store in a second line buffer, reserved in the memory, a third neighboring palette token (e.g., above-left palette token) to the current palette token of the palette token block of the current block in a third location of the second line buffer.

Probability table index calculation unit 400 may access the first palette token value and the second palette token value from the first line buffer and the third token value from the second line buffer. Arithmetic encoder 406 may perform arithmetic encoding on a current palette token value for the current palette token based on the first palette token value, the second palette token value, and the third palette token value.

The first line buffer may include a plurality of memory locations that each correspond to a row or a column of the palette token block, and the second line buffer may include a plurality of memory locations that each correspond to the row or the column of the palette token block. For example, a number of memory locations in the first line buffer and the second line buffer is equal to a number of rows or columns of the palette token block.

To access the first palette token value and the second palette token value from the first line buffer and the third token value from the second line buffer, probability table index calculation unit 400 may be configured to determine a row or a column of the current palette token value in the palette token block, and determine a first address for the first memory location in the first line buffer, a second address for the second memory location in the first line buffer, and a third address for the third memory location in the second line buffer based on the determined row or column of the current palette token value in the palette token block. Probability table index calculation unit 400 may access the first palette token value based on the first address, the second palette token value based on the second address, and the third palette token value based on the third address.

For example, in FIG. 6, the current palette token is located in the third row (e.g., row index 2). Probability table index calculation unit 400 may determine the address for the first memory location in the first line buffer in the memory location that corresponds to the second row of the palette token block (e.g., address 1) and determine the address for the second memory location in the first line buffer in the memory location that corresponds to the third row of the palette token block (e.g., address 2). Probability table index calculation unit 400 may determine the address for the third memory location in the third line buffer in the memory location that corresponds to the second row of the palette token block (e.g., address 1). In this way, the addressing for the memory locations is made relatively non-complex.

In one or more examples, subsequent to accessing the first palette token value and the second palette token value from the first line buffer and the third token value from the second line buffer, intra prediction unit 226 may store the first palette token value, stored in the first location of the first line buffer, into the third location of the second line buffer overwriting the third palette token value, and store a previous palette token value into the first location of the first line buffer overwriting the first palette token value. Probability table index calculation unit 400 may access the first palette token value and the second palette token value from the first line buffer and the third token value from the second line buffer in parallel with arithmetic encoder 406 arithmetic encoding a previous palette token value. In some examples, after arithmetic encoder 406 encodes the current palette token value, intra prediction unit 226 may store the current palette token value in the second location of the first line buffer overwriting the second palette token value.

Palette token entropy encoder 228 and intra prediction unit 226 may repeat such operations of accessing and overwriting memory locations in the first and second line buffers. In this way, rather than reserving memory locations for the entire palette token block for encoding, video encoder 200 may be configured to reserve the first line buffer and the second line buffer, which may require reserving fewer amount of memory.

FIG. 7 is a block diagram illustrating an example of a palette token entropy decoder. Palette token entropy decoder 322 may be configured to perform the reciprocal of the operations of palette token entropy encoder 228. For example, similar to probability table index calculation unit 400, probability table index calculation unit 500 may access the first palette token value and the second palette token value from the first line buffer and the third token value from the second line buffer. In this example, the first line buffer may store a first palette token value of a first neighboring palette token to a current palette token of a palette token block of a current block in a first location of the first line buffer and configured to store a second palette token value of a second neighboring palette token to the current palette token of the palette token block of the current block in a second location of the first line buffer. The second line buffer may store a third palette token value of a third neighboring palette token to the current palette token of the palette token block of the current block in a third location of the second line buffer.

To access the first palette token value and the second palette token value from the first line buffer and the third token value from the second line buffer, probability table index calculation unit 500 may be configured to determine a row or a column of the current palette token value in the palette token block, and determine a first address for the first memory location in the first line buffer, a second address for the second memory location in the first line buffer, and a third address for the third memory location in the second line buffer based on the determined row or column of the current palette token value in the palette token block. Probability table index calculation unit 500 may access the first palette token value based on the first address, the second palette token value based on the second address, and the third palette token value based on the third address.

As described above, the first line buffer includes a plurality of memory locations that each correspond to a row or a column of the palette token block, and the second line buffer includes a plurality of memory locations that each correspond to the row or the column of the palette token block. For instance, a number of memory locations in the first line buffer and the second line buffer is equal to a number of rows or columns of the palette token block.

Accordingly, determining the addresses for the first, second, and third palette token values may be based on the row or column of the current palette token. For example, the first address for the first memory location may be the memory location of the first line buffer that corresponds to the row above the current palette token, and the second address for the second memory location may be the memory location of the first line buffer that corresponds to the same row as the current palette token. The third address for the third memory location may be the memory location of the second line buffer that corresponds to the row above the current palette token.

Probability table 502 may receive the index from probability table index calculation unit 500, and output the one or more probability values to arithmetic decoder 506. Arithmetic decoder 506 may receive the bitstream signaled by video encoder 200 may decode a value based on the one or more probability values output by probability table 502. LUT 504 may receive the value and output the current palette token value. Palette token entropy decoder 322 may repeat such operations for the palette token values of the palette token block. Intra prediction unit 318 may then construct the palette token block based on the palette token values.

Similar to palette token entropy encoder 228, palette token entropy decoder 322 may be configured to perform operations in parallel with the decoding of a previous palette token value. For instance, arithmetic decoder 506 may be arithmetic decoding a previous palette token value, and in parallel, probability table index calculation unit 500 may access the first palette token value and the second palette token value from the first line buffer and the third token value from the second line buffer for decoding the current palette token value.

As described above, by having two line buffers, there may be reduction in amount of memory needed to store the palette token values for decoding relative to other techniques that store all palette token values, such as those of FIG. 8 described below. For instance, intra prediction unit 318 may be configured to, subsequent to probability table index calculation unit 500 accessing the first palette token value and the second palette token value from the first line buffer and the third token value from the second line buffer, store the first palette token value, stored in the first location of the first line buffer, into the third location of the second line buffer overwriting the third palette token value and store a previous palette token value into the first location of the first line buffer overwriting the first palette token value. In this example, the previous palette token value becomes available after probability table index calculation unit 500 accesses the first palette token value and the second palette token value from the first line buffer and the third token value from the second line buffer.

Figure 8:
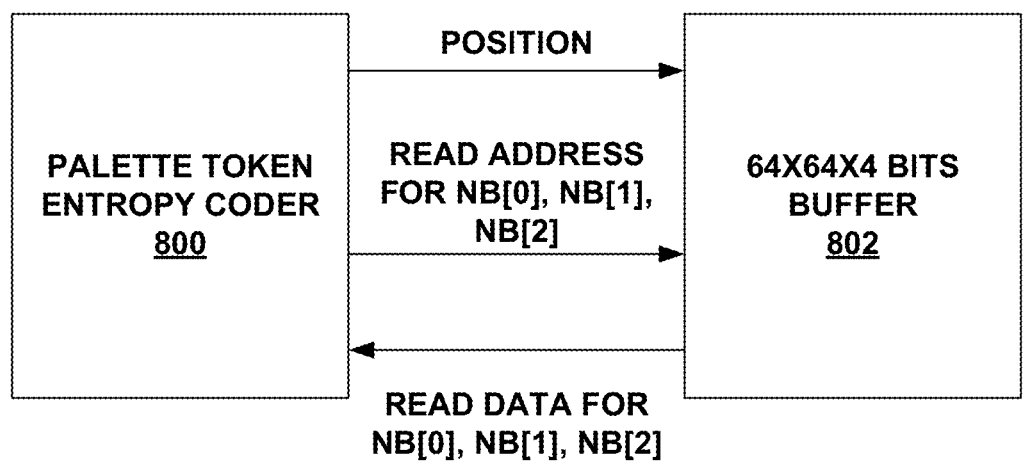
FIG. 8 is a block diagram illustrating an example of memory for palette token block coding.

FIG. 8 is a block diagram illustrating an example of memory for palette token block coding. For instance, FIG. 8 illustrates an example where instead of having two line buffers, a relatively large buffer is reserved to store all palette token values for decoding. FIG. 8 illustrates palette token entropy coder 800, examples of which include palette token entropy encoder 228 and palette token entropy decoder 322. FIG. 8 also illustrates buffer 802. In the example of FIG. 8, the palette token block size may be 64×64, and each palette token value may be 4 bits. Accordingly, buffer 802 may be 64×64×4 bit buffer (i.e., 16,384 bits).

In FIG. 8, buffer 802 may require one write port and three read ports. For example, one write port may be write the current palette token value based on the position of the current palette token in buffer 802. The three read ports may be for each of the neighboring palette token values based on the respective read addresses. Also, the read addresses may not be simple read addresses based on the row or column, as would be available with the two line buffers as described above. Rather, both the row and column information needs to be preserved to determine the addresses of the neighboring palette token values.

Figure 9:
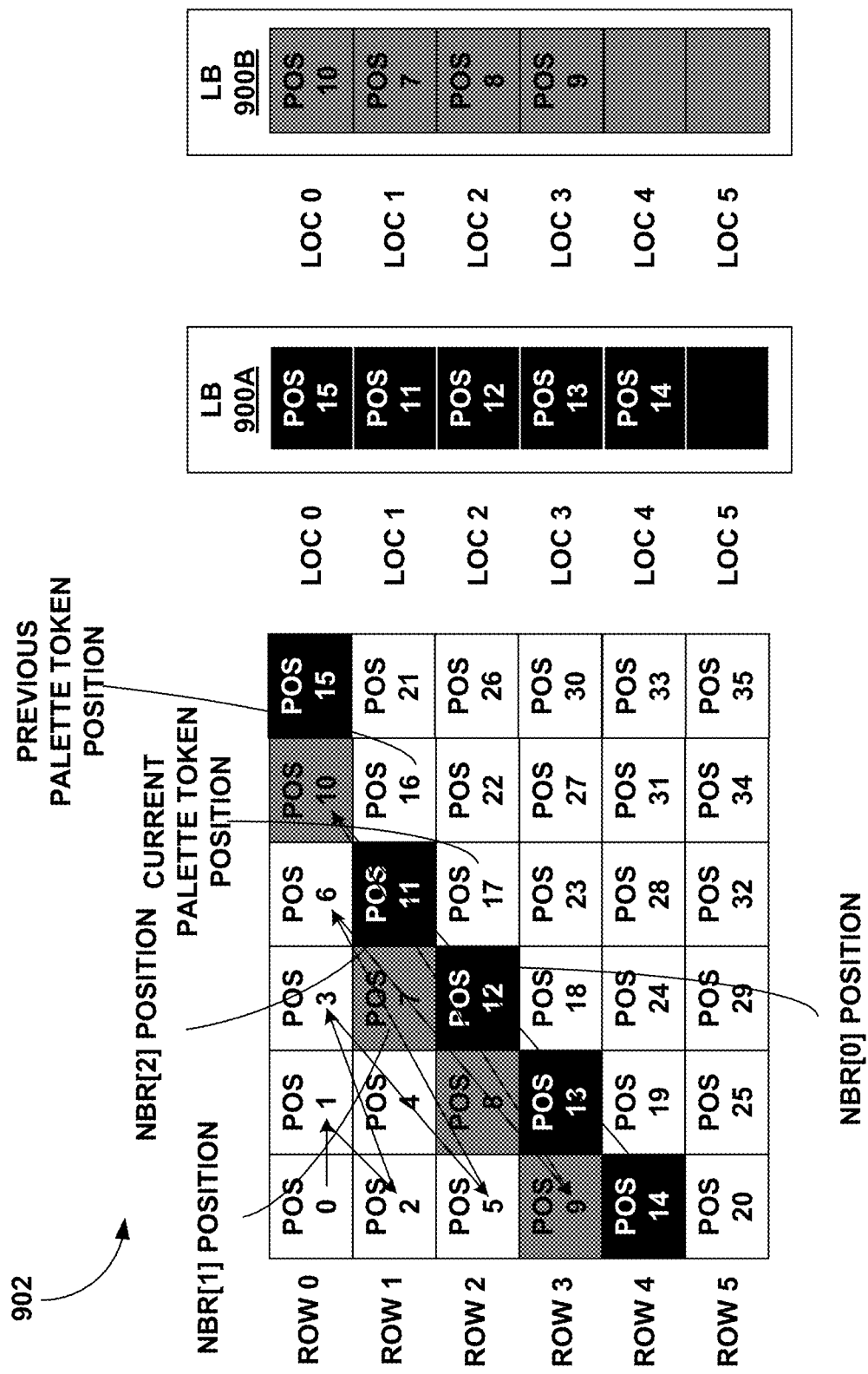
FIG. 9 is a conceptual diagram illustrating an example of line buffers for palette token block coding.

FIG. 9 is a conceptual diagram illustrating an example of line buffers for palette token block coding. FIG. 9 illustrates line buffer (LB) 900A and LB 900B. LB 900A is an example of the first line buffer, and LB 900B is an example of the second line buffer. In some examples, LB 900A and LB 900B may be separate, distinct buffers in memory (e.g., video data memory 230 or CPB memory 320 or within entropy encoding unit 220 or entropy decoding unit 302). In some examples, LB 900A and LB 900B may be formed in a double buffer (i.e., one buffer configured to include two line buffers). In some examples, LB 900A and LB 900B may be portions of a longer line buffer (e.g., first N memory locations of the longer line buffer are for LB 900A, and next N memory locations of the longer line buffer are for LB 900B).

Other possible configurations of LB 900A and LB 900B are possible, and in general, LB 900A and LB 900B represent buffers that are reserved in memory. Although possible, the area of memory reserved for LB 900A and LB 900B need not necessarily be contiguous. Also, although possible, addressing for memory locations of LB 900A and LB 900B may not necessarily be contiguous. In some examples, LB 900A and 900B may be reserved in fast accessible memory.

For example, LB 900A and LB 900B may store palette token values of palette token block for 902 generating a palette predictor block for a current block. In the example of FIG. 9, each memory location in LB 900A and LB 900B is associated with a row in palette token block 902. For instance, row 0 of palette token block 902 is associated with first memory location of LB 900A and LB 900B (e.g., LOC 0), row 1 of palette token block 902 is associated with second memory location of LB 900A and LB 900B (e.g., LOC 1), and so forth. As described above (e.g., with respect to FIGS. 3 and 5), the palette token values may each be an index into a list of palette colors for a palette predictor block used for palette mode coding the current block.

A row of palette token block 902 being associated with a memory location of LB 900A and LB 900B may mean that the memory location of LB 900A and LB 900B stores a palette token value from the row with which the memory location of LB 900A and LB 900B are associated. For instance, the first memory location of LB 900A stores the palette token value of the palette token located at position 15 in palette token block 902. The first memory location of LB 900B stores the palette token value of the palette token located at position 10 in palette token block 902. The second memory location of LB 900A stores the palette token value of the palette token located at position 11 in palette token block 902. The second memory location of LB 900B stores the palette token value of the palette token located at position 7 in palette token block 902, and so forth. As one example, as palette token entropy encoder 228 or palette token entropy decoder 322 encode or decode palette token values, intra prediction unit 226 or intra prediction unit 318, or possibly palette token entropy encoder 228 or palette token entropy decoder 322, may be configured to store palette token values in LB 900A and LB 900B.

For ease of description, palette token entropy encoder 228 or palette token entropy decoder 322 are described as storing values to respective LB 900A and LB 900B in each of entropy encoding unit 220 and entropy decoding unit 302 (e.g., each of entropy encoding unit 220 and entropy decoding unit 302 may include LB 900A and LB 900B). However, the techniques are not so limited, and other components, such as intra prediction unit 226 or intra prediction unit 318 may be configured to store values to respective LB 900A and LB 900B.

In the example of FIG. 9, memory locations of LB 900A and LB 900B are described as being associated with respective rows of palette token block 902. However, the techniques are not so limited. In some examples, the first line buffer (e.g., LB 900A) includes a plurality of memory locations that each correspond to a row or a column of palette token block 902, and the second line buffer (e.g., LB 900B) includes a plurality of memory locations that each correspond to the row or the column of palette token block 902. A number of memory locations in the first line buffer (e.g., LB 900A) and the second line buffer (e.g., 900B) may be equal to a number of rows or columns of palette token block 902.

For example, if there can be a maximum of 64×64 sized blocks for palette mode coding, and each palette token value is 4 bits, then the size of LB 900A is 64×4, and the size of LB 900B is 64×4, for a total of 64×2×4. As described in FIG. 8, the size of buffer 802 may be 64×64×2. Accordingly, using the example techniques described in this disclosure may result in 97% reduction in amount of memory that needs to be reserved (e.g., (64×2×4)/(64×64×4)=3.125%). The maximum size of 64×64 is provided simply to ease with understanding, and other sized blocks are possible.

In FIG. 9, the palette token value at position 17 of palette token block 902 is the current palette token position. Accordingly, palette token entropy encoder 228 or palette token entropy decoder 322 may be configured to access the neighboring palette token values to determine the one or more probability values for arithmetic coding the current palette token value. Also, in the example of FIG. 9, the palette token value at position 16 of palette token block 902 is the previous palette token position. As described above, due to the parallel operations of palette token entropy encoder 228 or palette token entropy decoder 322, palette token entropy encoder 228 or palette token entropy decoder 322 may be configured to access the neighboring palette token values for the current palette token in parallel with arithmetic coding a previous palette token value (e.g., the palette token value of the palette token at position 16).

The neighboring palette token values may be NB[0], NB[1], and NB[2]. NB[0] may be the above palette token to the current palette token, and therefore, NB[0] is palette token at position 11, having the palette token value of TKN[11]. NB[1] may be the above-left palette token to the current palette token, and therefore, NB[1] is palette token at position 7, having the palette token value of TKN[7]. NB[2] may be the left palette token to the current palette token, and therefore, NB[2] is palette token at position 12, having the palette token value of TKN[12]. In one or more examples, TKN[11] may be considered as a first palette token value of a first neighboring palette token (e.g., NB[0]). TKN[12] may be considered as a second palette token value of a second neighboring palette token (e.g., NB[2]). TKN[7] may be considered as a third palette token value of a third neighboring palette token (e.g., NB[1]).

As illustrated in FIG. 9, LB 900A (e.g., first line buffer) may be configured to store a first palette token value of a first neighboring palette token (e.g., TKN[11] for position 11 in palette token block 902) to a current palette token (e.g., in position 17) of palette token block 902 of a current block in a first location (e.g., LOC 1) of LB 900A and configured to store a second palette token value of a second neighboring palette token (e.g., TKN[12] for position 12 in palette token block 902) to the current palette token of the palette token block of the current block in a second location (e.g., LOC 2) of LB 900A. LB 900B (e.g., second line buffer) may be configured to store a third palette token value of a third neighboring palette token (e.g., TKN[7] for position 7 in palette token block 902) to the current palette token of the palette token block of the current block in a third location (e.g., LOC 1) of LB 900B.

In one or more examples, palette token entropy encoder 228 or palette token entropy decoder 322 may access the first palette token value and the second palette token value from the first line buffer (e.g., LB 900A) and the third token value from the second line buffer (e.g., LB 900B). Palette token entropy encoder 228 or palette token entropy decoder 322 may arithmetic code (e.g., encode or decode) a current palette token value for the current palette token based on the first palette token value, the second palette token value, and the third palette token value.

For instance, probability table 402 or probability table 502 may determine one or more probability values based on index from probability table index calculation unit 400 or probability table index calculation unit 500. Probability table index calculation unit 400 or probability table index calculation unit 500 may determine the index based on the first palette token value, the second palette token value, and the third palette token value. Arithmetic encoder 406 or arithmetic decoder 506 may arithmetic encode or decode the current palette token value based on the one or more probability values. Also, while probability table 402 or probability table 502 may determine one or more probability values based on index from probability table index calculation unit 400 or probability table index calculation unit 500, arithmetic encoder 406 and arithmetic decoder 506 may be configured to arithmetic encode or decode the previous palette token value.

As described above, in one or more examples, each of the memory locations of LB 900A and LB 900B may be associated with a row or column of palette token block 902. Such association may result in simpler addressing for the neighboring palette token values (e.g., palette token values NB[0], NB[1], and NB[2]) in LB 900A and LB 900B. For example, the addressing for the first memory location and the second memory location in LB 900A and the address for the third memory location in LB 900B may be based on the row or column of the current palette token (e.g., at position 17, in row 2).

For instance, to access the first palette token value and the second palette token value from LB 900A and the third token value from LB 900B, palette token entropy encoder 228 and palette token entropy decoder 322 may be configured to determine a row or a column of the current palette token in palette token block 902. In the example of FIG. 9, the current palette token is located at position 17, which is in row 2 of palette token block 902.

Palette token entropy encoder 228 and palette token entropy decoder 322 may determine a first address for the first memory location in LB 900A, a second address for the second memory location in LB 900A, and a third address for the third memory location in LB 900B based on the determined row or column of the current palette token value in palette token block 902. For example, the address for the first memory location in LB 900A may be the memory location associated with the row that is above the row that includes the current palette token (e.g., LOC 1 of LB 900A). The address for the second memory location in LB 900A may be the memory location associated with the row that includes the current palette token (e.g., LOC 2 of LB 900A). The address for the third memory location in LB 900B may be the memory location associated with the row that is above the row that includes the current palette token (e.g., LOC 1 of LB 900B). Palette token entropy encoder 228 and palette token entropy decoder 322 may access the first palette token value based on the first address, the second palette token value based on the second address, and the third palette token value based on the third address.

Figure 10:
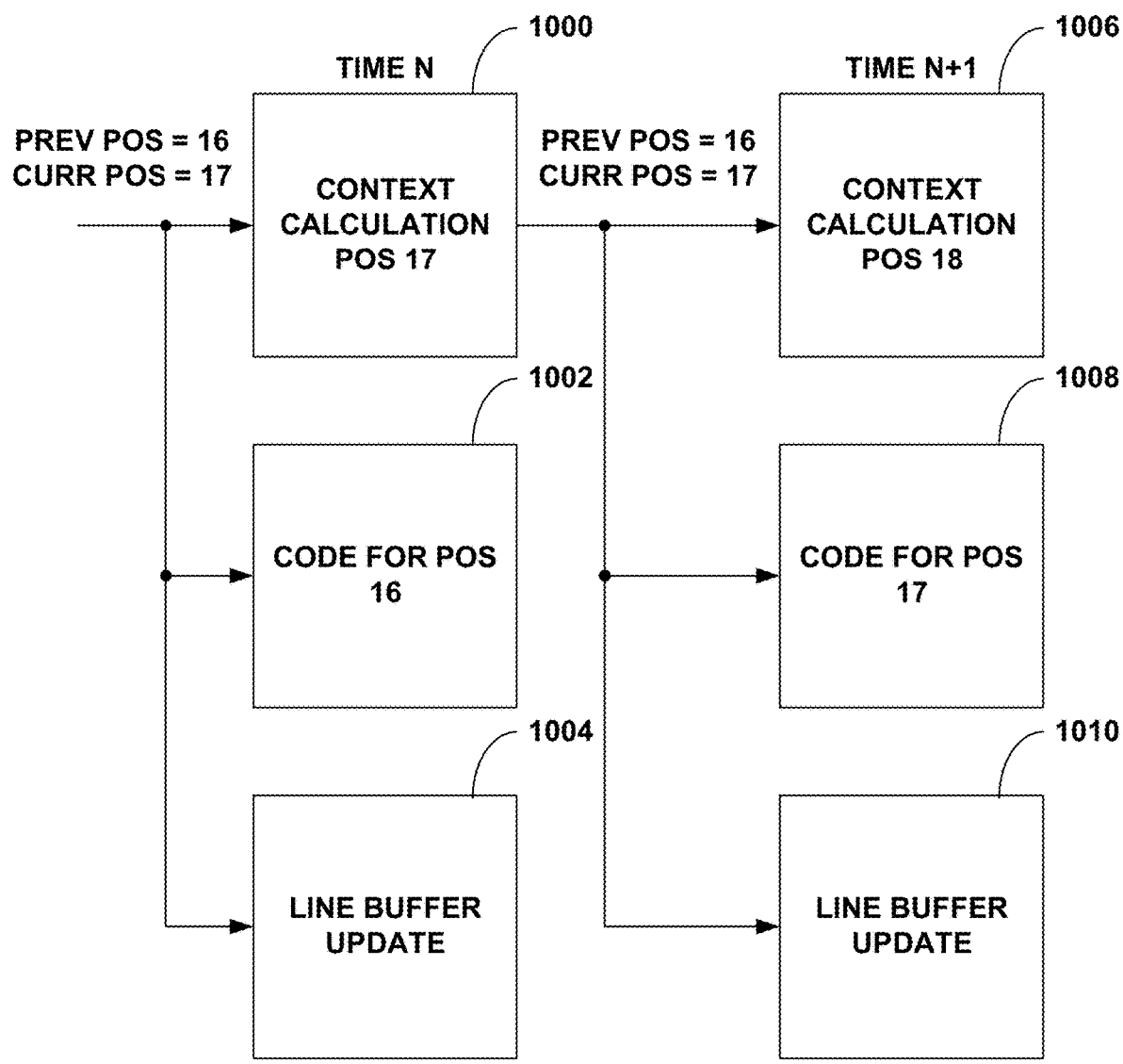
FIG. 10 is a flow diagram illustrating an example flow of palette token values being coded.

FIG. 10 is a flow diagram illustrating an example flow of palette token values being coded. In the example of FIG. 10, at time N, the position of the current palette token is position 17 in palette token block 902, and the position the previous palette token is position 16. At time N, palette token entropy encoder 228 and palette token entropy decoder 322 may access the first palette token value (e.g., TKN[11]) and the second palette token value (e.g., TKN[12]) from LB 900A and the third token value (e.g., TKN[7]) from LB 900B (1000). In parallel, palette token entropy encoder 228 and palette token entropy decoder 322 may encode or decode the previously palette token value for previous palette token at position 16 (1002). For example, probability table index calculation unit 400 and probability table index calculation unit 500 may access the first palette token value (e.g., TKN[11]) and the second palette token value (e.g., TKN [12]) from LB 900A and the third token value (e.g., TKN[7]) from LB 900B in parallel with arithmetic encoder 406 or arithmetic decoder 506 encoding or decoding the previous palette token value.

Palette token entropy encoder 228 and palette token entropy decoder 322 may be configured to update LB 900A and LB 900B (1004). For example, subsequent to accessing the first palette token value and the second palette token value from the first line buffer (e.g., LB 900A) and the third token value from the second line buffer (e.g., LB 900B), palette token entropy encoder 228 and palette token entropy decoder 322 may store the first palette token value, stored in the first location of LB 900A, into the third location of LB 900B overwriting the third palette token value and store a previous palette token value (e.g., palette token value for position 16) into the first location of LB 900A overwriting the first palette token value. For instance, palette token entropy encoder 228 and palette token entropy decoder 322 may copy TKN[11] (e.g., first palette token value) from LOC 1 of LB 900A to LOC 1 of LB 900B overwriting TKN[7] (e.g., third palette token value). Intra prediction unit 226 or intra prediction unit 318 may store TKN[16] (e.g., previous palette token value) in LOC 1 of LB 900A overwriting TKN[11] (e.g., first palette token value).

At time N+1, the position of the current palette token is position 18 in palette token block 902, and the position the previous palette token is position 17. Palette token entropy encoder 228 and palette token entropy decoder 322 may access the first palette token value (e.g., TKN[12]) and the second palette token value (e.g., TKN[13]) from LB 900A and the third token value (e.g., TKN[8]) from LB 900B (1006). In parallel, palette token entropy encoder 228 and palette token entropy decoder 322 may encode or decode the previously palette token value for previous palette token at position 17 (1008). For example, probability table index calculation unit 400 and probability table index calculation unit 500 may access the first palette token value (e.g., TKN[12]) and the second palette token value (e.g., TKN [13]) from LB 900A and the third token value (e.g., TKN[8]) from LB 900B in parallel with arithmetic encoder 406 or arithmetic decoder 506 encoding or decoding the previous palette token value.

Palette token entropy encoder 228 and palette token entropy decoder 322 may be configured to update LB 900A and LB 900B (1010). For example, subsequent to accessing the first palette token value and the second palette token value from the first line buffer (e.g., LB 900A) and the third token value from the second line buffer (e.g., LB 900B), palette token entropy encoder 228 and palette token entropy decoder 322 may store the first palette token value, stored in the first location of LB 900A, into the third location of LB 900B overwriting the third palette token value and store a previous palette token value (e.g., palette token value for position 17) into the first location of LB 900A overwriting the first palette token value. For instance, palette token entropy encoder 228 and palette token entropy decoder 322 may copy TKN[12] (e.g., first palette token value) from LOC 2 of LB 900A to LOC 2 of LB 900B overwriting TKN[8] (e.g., third palette token value). Palette token entropy encoder 228 and palette token entropy decoder 322 may store TKN[17] (e.g., previous palette token value) in LOC 2 of LB 900A overwriting TKN[12] (e.g., first palette token value).

Figure 11:
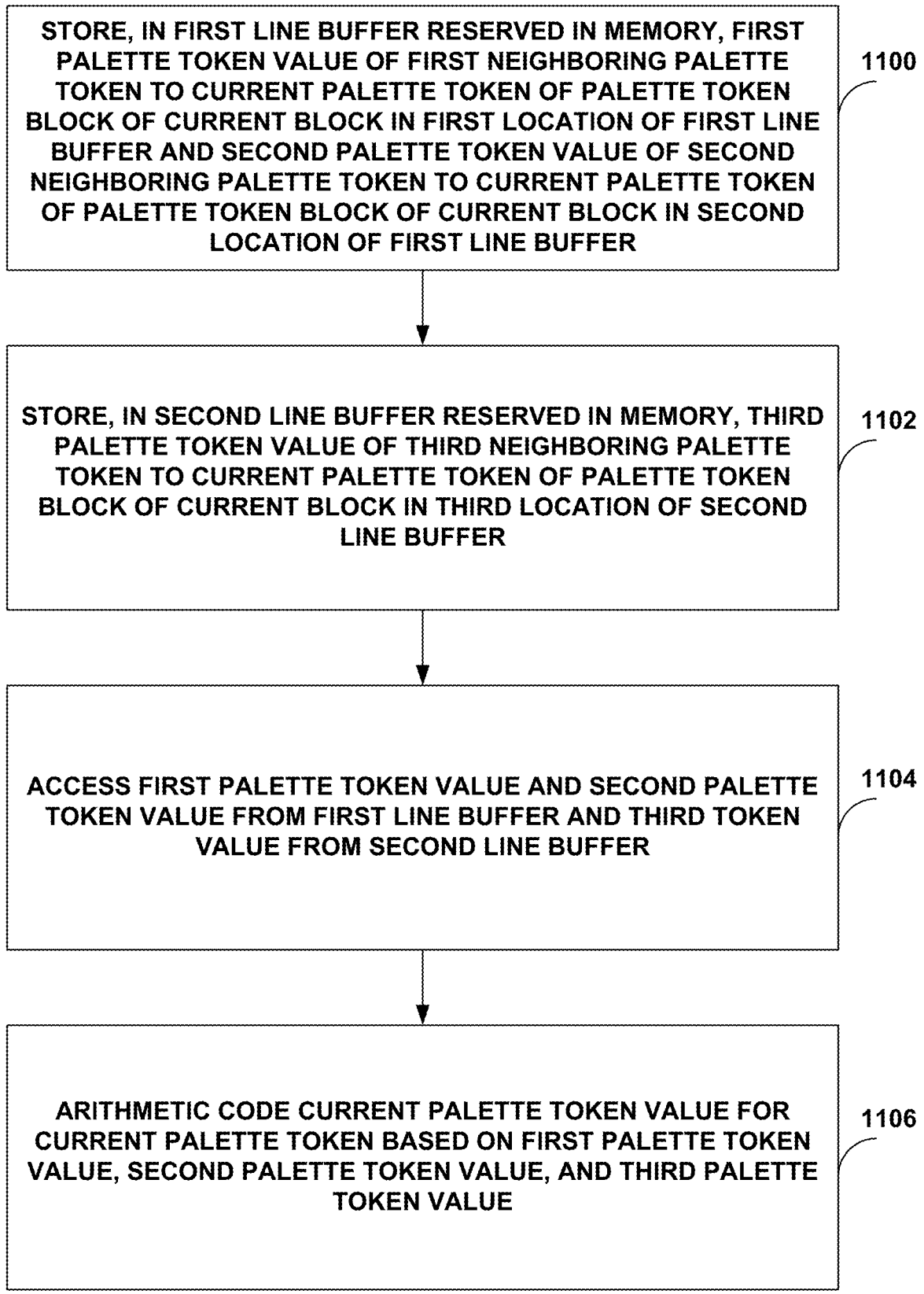
FIG. 11 is a flowchart illustrating an example method of operation.

FIG. 11 is a flowchart illustrating an example method of operation. The example of FIG. 11 is described with respect to one or more processors. Examples of the one or more processors include processing circuitry of video encoder 200 and video decoder 300, which may be fixed-function circuitry, programmable circuitry, or a combination thereof.

One or more processors may be configured to store, in a first line buffer (e.g., LB 900A) reserved in memory (e.g., video data memory 230 or CPB memory 320 or some other memory), a first palette token value of a first neighboring palette token to a current palette token of a palette token block (e.g., palette token block 902) of a current block in a first location of the first line buffer and a second palette token value of a second neighboring palette token to the current palette token of the palette token block of the current block in a second location of the first line buffer (1100). The one or more processors may also be configured to store in a second line buffer (e.g., LB 900B) reserved in the memory, a third palette token value of a third neighboring palette token to the current palette token of the palette token block of the current block in a third location of the second line buffer (1102).

The first palette token value, the second palette token value, and the third palette token value may each be an index into a list of palette colors for a palette predictor block used for palette mode coding the current block. For example, as illustrated in FIGS. 3 and 5, the palette token block includes palette token values from 0 to 2, where each palette token value is an index into the list of palette colors. For instance, palette token value of 0 is index 0 into the list of palette colors and identifies the palette color 55, palette token value of 1 is index 1 into the list of palette colors and identifies the palette color 100, and palette token value of 2 is index 2 into the list of palette colors and identifies the palette color 200. Each of the palette token values in the palette token block also correspond to a prediction sample in the predictor block.

The first line buffer includes a plurality of memory locations that each correspond to a row or a column of the palette token block 902, and the second line buffer includes a plurality of memory locations that each correspond to the row or the column of the palette token block 902. In some examples, a number of memory locations in the first line buffer and the second line buffer is equal to a number of rows or columns of the palette token block 902.

The one or more processors may access the first palette token value and the second palette token value from the first line buffer and the third token value from the second line buffer (1104). For example, to access the first palette token value and the second palette token value from the first line buffer and the third token value from the second line buffer, probability table index calculation unit 400 of palette token entropy encoder 228 and probability table index calculation unit 500 of palette token entropy decoder 322 may determine a row or a column of the current palette token in the palette token block 902, determine a first address for the first memory location in the first line buffer, a second address for the second memory location in the first line buffer, and a third address for the third memory location in the second line buffer based on the determined row or column of the current palette token value in palette token block 902, and access the first palette token value based on the first address, the second palette token value based on the second address, and the third palette token value based on the third address.

In some examples, to access the first palette token value and the second palette token value from the first line buffer and the third token value from the second line buffer, probability table index calculation unit 400 of palette token entropy encoder 228 and probability table index calculation unit 500 of palette token entropy decoder 322 may access the first palette token value and the second palette token value from the first line buffer and the third token value from the second line buffer in parallel with arithmetic coding a previous palette token value. For example, as described above, while arithmetic encoder 406 or arithmetic decoder 506 is encoding or decoding the previous palette token value at position 16, probability table index calculation unit 400 and probability table index calculation unit 500 may access the first palette token value, the second palette token value, and the third palette token value for coding the current palette token value of the current palette token at position 17.

In one or more examples, subsequent to accessing the first palette token value and the second palette token value from the first line buffer and the third token value from the second line buffer, intra prediction unit 226 and intra prediction unit 318 may store the first palette token value, stored in the first location of the first line buffer, into the third location of the second line buffer overwriting the third palette token value, and store a previous palette token value into the first location of the first line buffer overwriting the first palette token value. For example, as described with respect to FIG. 10, intra prediction unit 226 or intra prediction unit 318 may copy TKN[11] (e.g., first palette token value) from LOC 1 of LB 900A to LOC 1 of LB 900B overwriting TKN[7] (e.g., third palette token value). Intra prediction unit 226 or intra prediction unit 318 may store TKN[16] (e.g., previous palette token value) in LOC 1 of LB 900A overwriting TKN[11] (e.g., first palette token value).

The one or more processors may arithmetic code a current palette token value for the current palette token based on the first palette token value, the second palette token value, and the third palette token value (1106). For example, probability table 402 and probability table 502 may determine one or more probability values for arithmetic coding the current palette token value based on the first palette token value, the second palette token value, and the third palette token value. Arithmetic encoder 406 or arithmetic decoder 506 may arithmetic encode or decode the current palette token value based on the determined one or more probability values.

In examples where the one or more processors are for video decoder 300, the one or more processors may generate the palette predictor block based on the current palette token value, the first palette token value, the second palette token value, and the third palette token value (e.g., as described in FIG. 5). The one or more processors may also receive information indicative of a residual between the current block and the palette predictor block and reconstruct the current block based on received information and the palette predictor block.

In examples where the one or more processors are for video encoder 200, the one or more processors may generate the palette predictor block (e.g., as describe with FIG. 3), determine information indicative of a residual between the current block and the palette predictor block, and determine the current palette token value, the first palette token value, the second palette token value, and the third palette token value based on the palette predictor block for arithmetic encoding the current palette token value based on the first palette token value, the second palette token value, and the third palette token value. The one or more processors may signal the information indicative of the residual and a result of the arithmetic encoding.

The following describes one or more example techniques described in this disclosure. The example techniques may be performed alone or in any combination.

Clause 1: An apparatus configured to decode video data includes a first line buffer, reserved in memory, configured to store a first palette token value of a first neighboring palette token to a current palette token of a palette token block of a current block in a first location of the first line buffer and configured to store a second palette token value of a second neighboring palette token to the current palette token of the palette token block of the current block in a second location of the first line buffer; a second line buffer, reserved in the memory, configured to store a third palette token value of a third neighboring palette token to the current palette token of the palette token block of the current block in a third location of the second line buffer, wherein the first palette token value, the second palette token value, and the third palette token value are each an index into a list of palette colors for a palette predictor block used for palette mode coding the current block; and one or more processors implemented in circuitry and in communication with the first line buffer and the second line buffer, the one or more processors configured to: access the first palette token value and the second palette token value from the first line buffer and the third token value from the second line buffer; and arithmetic code a current palette token value for the current palette token based on the first palette token value, the second palette token value, and the third palette token value.

Clause 2: The apparatus of clause 1, wherein the first line buffer includes a plurality of memory locations that each correspond to a row or a column of the palette token block, and wherein the second line buffer includes a plurality of memory locations that each correspond to the row or the column of the palette token block.

Clause 3: The apparatus of any of clauses 1 and 2, wherein to access the first palette token value and the second palette token value from the first line buffer and the third token value from the second line buffer, the one or more processors are configured to: determine a row or a column of the current palette token in the palette token block; determine a first address for the first memory location in the first line buffer, a second address for the second memory location in the first line buffer, and a third address for the third memory location in the second line buffer based on the determined row or column of the current palette token value in the palette token block; and access the first palette token value based on the first address, the second palette token value based on the second address, and the third palette token value based on the third address.

Clause 4: The apparatus of any of clauses 1 through 3, wherein a number of memory locations in the first line buffer and the second line buffer is equal to a number of rows or columns of the palette token block that includes palette token values that are indices into the list of palette colors for the palette predictor block.

Clause 5: The apparatus of any of clauses 1 through 4, wherein the one or more processors are configured to access the first palette token value and the second palette token value from the first line buffer and the third token value from the second line buffer in parallel with arithmetic coding a previous palette token value.

Clause 6: The apparatus of any of clauses 1 through 5, wherein the one or more processors are configured to, subsequent to accessing the first palette token value and the second palette token value from the first line buffer and the third token value from the second line buffer: store the first palette token value, stored in the first location of the first line buffer, into the third location of the second line buffer overwriting the third palette token value; and store a previous palette token value into the first location of the first line buffer overwriting the first palette token value.

Clause 7: The apparatus of any of clauses 1 through 6, wherein to arithmetic code, the one or more processors are configured to: determine one or more probability values for arithmetic coding the current palette token value based on the first palette token value, the second palette token value, and the third palette token value; and arithmetic code the current palette token value based on the determined one or more probability values.

Clause 8: The apparatus of any of clauses 1 through 7, wherein to arithmetic code, the one or more processors are configured to arithmetic decode the current palette token, and wherein the one or more processors are further configured to: generate the palette predictor block based on the current palette token value, the first palette token value, the second palette token value, and the third palette token value; receive information indicative of a residual between the current block and the palette predictor block; and reconstruct the current block based on received information and the palette predictor block.

Clause 9: The apparatus of any of clauses 1 through 8, further comprising a display configured to display the reconstructed current block.

Clause 10: The apparatus of any of clauses 1 through 9, wherein the one or more processors are configured to: generate the palette predictor block; determine information indicative of a residual between the current block and the palette predictor block; determine the current palette token value, the first palette token value, the second palette token value, and the third palette token value based on the palette predictor block, wherein to arithmetic code, the one or more processors are configured to arithmetic encode the current palette token value based on the first palette token value, the second palette token value, and the third palette token value; and signal the information indicative of the residual and a result of the arithmetic encoding.

Clause 11: The apparatus of clause 10, further comprising a camera configured to capture a picture that includes the current block.

Clause 12: The apparatus of any of clauses 1 through 11, wherein the apparatus comprises one or more of a camera, a computer, a mobile device, a broadcast receiver device, or a set-top box.

Clause 13: A method of coding video data includes storing, in a first line buffer reserved in memory, a first palette token value of a first neighboring palette token to a current palette token of a palette token block of a current block in a first location of the first line buffer and a second palette token value of a second neighboring palette token to the current palette token of the palette token block of the current block in a second location of the first line buffer; storing, in a second line buffer reserved in the memory, a third palette token value of a third neighboring palette token to the current palette token of the palette token block of the current block in a third location of the second line buffer, wherein the first palette token value, the second palette token value, and the third palette token value are each an index into a list of palette colors for a palette predictor block used for palette mode coding the current block; accessing the first palette token value and the second palette token value from the first line buffer and the third token value from the second line buffer; and arithmetic coding a current palette token value for the current palette token based on the first palette token value, the second palette token value, and the third palette token value.

Clause 14: The method of clause 13, wherein the first line buffer includes a plurality of memory locations that each correspond to a row or a column of the palette token block, and wherein the second line buffer includes a plurality of memory locations that each correspond to the row or the column of the palette token block.

Clause 15: The method of any of clauses 13 and 14, wherein accessing the first palette token value and the second palette token value from the first line buffer and the third token value from the second line buffer comprises: determining a row or a column of the current palette token in the palette token block; determining a first address for the first memory location in the first line buffer, a second address for the second memory location in the first line buffer, and a third address for the third memory location in the second line buffer based on the determined row or column of the current palette token value in the palette token block; and accessing the first palette token value based on the first address, the second palette token value based on the second address, and the third palette token value based on the third address.

Clause 16: The method of any of clauses 13 through 15, wherein a number of memory locations in the first line buffer and the second line buffer is equal to a number of rows or columns of the palette token block that includes palette token values that are indices into the list of palette colors for the palette predictor block.

Clause 17: The method of any of clauses 13 through 16, wherein accessing the first palette token value and the second palette token value from the first line buffer and the third token value from the second line buffer comprises accessing the first palette token value and the second palette token value from the first line buffer and the third token value from the second line buffer in parallel with arithmetic coding a previous palette token value.

Clause 18: The method of any of clauses 13 through 17, further comprising, subsequent to accessing the first palette token value and the second palette token value from the first line buffer and the third token value from the second line buffer: storing the first palette token value, stored in the first location of the first line buffer, into the third location of the second line buffer overwriting the third palette token value; and storing a previous palette token value into the first location of the first line buffer overwriting the first palette token value.

Clause 19: The method of any of clauses 13 through 18, wherein arithmetic coding comprises: determining one or more probability values for arithmetic coding the current palette token value based on the first palette token value, the second palette token value, and the third palette token value; and arithmetic coding the current palette token value based on the determined one or more probability values.

Clause 20: The method of any of clauses 13 through 19, wherein arithmetic coding comprises arithmetic decoding the current palette token, the method further includes generating the palette predictor block based on the current palette token value, the first palette token value, the second palette token value, and the third palette token value; receiving information indicative of a residual between the current block and the palette predictor block; and reconstructing the current block based on received information and the palette predictor block.

Clause 21: The method of any of clauses 13 through 20, further includes generating the palette predictor block; determining information indicative of a residual between the current block and the palette predictor block; determining the current palette token value, the first palette token value, the second palette token value, and the third palette token value based on the palette predictor block, wherein arithmetic coding comprises arithmetic encoding the current palette token value based on the first palette token value, the second palette token value, and the third palette token value; and signaling the information indicative of the residual and a result of the arithmetic encoding.

Clause 22: A device of coding video data includes means for storing, in a first line buffer reserved in memory, a first palette token value of a first neighboring palette token to a current palette token of a palette token block of a current block in a first location of the first line buffer and configured to store a second palette token value of a second neighboring palette token to the current palette token of the palette token block of the current block in a second location of the first line buffer; means for storing, in a second line buffer reserved in the memory, a third palette token value of a third neighboring palette token to the current palette token of the palette token block of the current block in a third location of the second line buffer, wherein the first palette token value, the second palette token value, and the third palette token value are each an index into a list of palette colors for a palette predictor block used for palette mode coding the current block; means for accessing the first palette token value and the second palette token value from the first line buffer and the third token value from the second line buffer; and means for arithmetic coding the current palette token value for the current palette token based on the first palette token value, the second palette token value, and the third palette token value.

Clause 23: A computer-readable storage medium storing instructions thereon that when executed cause one or more processors to: store, in a first line buffer reserved in memory, a first palette token value of a first neighboring palette token to a current palette token of a palette token block of a current block in a first location of the first line buffer and configured to store a second palette token value of a second neighboring palette token to the current palette token of the palette token block of the current block in a second location of the first line buffer; store, in a second line buffer reserved in the memory, a third palette token value of a third neighboring palette token to the current palette token of the palette token block of the current block in a third location of the second line buffer, wherein the first palette token value, the second palette token value, and the third palette token value are each an index into a list of palette colors for a palette predictor block used for palette mode coding the current block; access the first palette token value and the second palette token value from the first line buffer and the third token value from the second line buffer; and arithmetic code the current palette token value for the current palette token based on the first palette token value, the second palette token value, and the third palette token value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video data, the apparatus comprising:
    a first line buffer, reserved in memory, configured to store a first palette token value of a first neighboring palette token to a current palette token of a palette token block of a current block in a first memory location of the first line buffer and configured to store a second palette token value of a second neighboring palette token to the current palette token of the palette token block of the current block in a second memory location of the first line buffer, wherein the first neighboring palette token and the second neighboring palette token are included in the palette token block and are adjacent to the current palette token in the palette token block;
    a second line buffer, reserved in the memory, configured to store a third palette token value of a third neighboring palette token to the current palette token of the palette token block of the current block in a third memory location of the second line buffer, wherein the third neighboring palette token is included in the palette token block and is adjacent to the current palette token in the palette token block, wherein the first palette token value, the second palette token value, and the third palette token value are each an index into a list of palette colors for a palette predictor block used for palette mode coding the current block; and
    one or more processors implemented in circuitry and in communication with the first line buffer and the second line buffer, the one or more processors configured to:
        determine a row or a column of the current palette token in the palette token block;
        determine a first address for the first memory location in the first line buffer, a second address for the second memory location in the first line buffer, and a third address for the third memory location in the second line buffer based on the row or column of the current palette token value in the palette token block;
        access the first palette token value from the first line buffer based on the first address, the second palette token value from the first line buffer based on the second address, and the third token value from the second line buffer based on the third address; and
        code a current palette token value for the current palette token based on the first palette token value, the second palette token value, and the third palette token value.

2. The apparatus of claim 1, wherein the first line buffer includes a first plurality of memory locations that each correspond to a row or a column of the palette token block, and wherein the second line buffer includes a second plurality of memory locations that each correspond to the row or the column of the palette token block.

3. The apparatus of claim 1, wherein a number of memory locations in the first line buffer and the second line buffer is equal to a number of rows or columns of the palette token block that includes palette token values that are indices into the list of palette colors for the palette predictor block.

4. The apparatus of claim 1, wherein the one or more processors are configured to access the first palette token value and the second palette token value from the first line buffer and the third token value from the second line buffer in parallel with coding a previous palette token value.

5. The apparatus of claim 1, wherein the one or more processors are configured to, subsequent to accessing the first palette token value and the second palette token value from the first line buffer and the third token value from the second line buffer:
    store the first palette token value, stored in the first memory location of the first line buffer, into the third memory location of the second line buffer overwriting the third palette token value; and
    store a previous palette token value into the first memory location of the first line buffer overwriting the first palette token value.

6. The apparatus of claim 1, wherein to code, the one or more processors are configured to:
    determine one or more probability values for coding the current palette token value based on the first palette token value, the second palette token value, and the third palette token value; and
    code the current palette token value based on the determined one or more probability values.

7. The apparatus of claim 1, wherein to code, the one or more processors are configured to decode the current palette token, and wherein the one or more processors are further configured to:
    generate the palette predictor block based on the current palette token value, the first palette token value, the second palette token value, and the third palette token value;
    receive information indicative of a residual between the current block and the palette predictor block; and
    reconstruct the current block based on received information and the palette predictor block.

8. The apparatus of claim 7, further comprising a display configured to display the reconstructed current block.

9. The apparatus of claim 1, wherein the one or more processors are configured to:
    generate the palette predictor block;
    determine information indicative of a residual between the current block and the palette predictor block;
    determine the current palette token value, the first palette token value, the second palette token value, and the third palette token value based on the palette predictor block, wherein to code, the one or more processors are configured to encode the current palette token value based on the first palette token value, the second palette token value, and the third palette token value; and
    signal the information indicative of the residual and a result of the encoding.

10. The apparatus of claim 9, further comprising a camera configured to capture a picture that includes the current block.

11. The apparatus of claim 1, wherein the apparatus comprises one or more of a camera, a computer, a mobile device, a broadcast receiver device, or a set-top box.

12. A method of coding video data, the method comprising:
    storing, in a first line buffer reserved in memory, a first palette token value of a first neighboring palette token to a current palette token of a palette token block of a current block in a first memory location of the first line buffer and a second palette token value of a second neighboring palette token to the current palette token of the palette token block of the current block in a second memory location of the first line buffer, wherein the first neighboring palette token and the second neighboring palette token are included in the palette token block and are adjacent to the current palette token in the palette token block;
storing, in a second line buffer reserved in the memory, a third palette token value of a third neighboring palette token to the current palette token of the palette token block of the current block in a third memory location of the second line buffer, wherein the third neighboring palette token is included in the palette token block and is adjacent to the current palette token in the palette token block, wherein the first palette token value, the second palette token value, and the third palette token value are each an index into a list of palette colors for a palette predictor block used for palette mode coding the current block;
determining a row or a column of the current palette token in the palette token block;
determining a first address for the first memory location in the first line buffer, a second address for the second memory location in the first line buffer, and a third address for the third memory location in the second line buffer based on the row or column of the current palette token value in the palette token block;
accessing the first palette token value from the first line buffer based on the first address, the second palette token value from the first line buffer based on the second address, and the third token value from the second line buffer based on the third address; and
coding a current palette token value for the current palette token based on the first palette token value, the second palette token value, and the third palette token value.

13. The method of claim 12, wherein the first line buffer includes a first plurality of memory locations that each correspond to a row or a column of the palette token block, and wherein the second line buffer includes a second plurality of memory locations that each correspond to the row or the column of the palette token block.

14. The method of claim 12, wherein a number of memory locations in the first line buffer and the second line buffer is equal to a number of rows or columns of the palette token block that includes palette token values that are indices into the list of palette colors for the palette predictor block.

15. The method of claim 12, wherein accessing the first palette token value and the second palette token value from the first line buffer and the third token value from the second line buffer comprises accessing the first palette token value and the second palette token value from the first line buffer and the third token value from the second line buffer in parallel with coding a previous palette token value.

16. The method of claim 12, further comprising, subsequent to accessing the first palette token value and the second palette token value from the first line buffer and the third token value from the second line buffer:
storing the first palette token value, stored in the first memory location of the first line buffer, into the third memory location of the second line buffer overwriting the third palette token value; and
storing a previous palette token value into the first memory location of the first line buffer overwriting the first palette token value.

17. The method of claim 12, wherein coding comprises:
determining one or more probability values for coding the current palette token value based on the first palette token value, the second palette token value, and the third palette token value; and
coding the current palette token value based on the determined one or more probability values.

18. The method of claim 12, wherein coding comprises decoding the current palette token, the method further comprising:
generating the palette predictor block based on the current palette token value, the first palette token value, the second palette token value, and the third palette token value;
receiving information indicative of a residual between the current block and the palette predictor block; and
reconstructing the current block based on received information and the palette predictor block.

19. The method of claim 12, further comprising:
generating the palette predictor block;
determining information indicative of a residual between the current block and the palette predictor block;
determining the current palette token value, the first palette token value, the second palette token value, and the third palette token value based on the palette predictor block, wherein coding comprises encoding the current palette token value based on the first palette token value, the second palette token value, and the third palette token value; and
signaling the information indicative of the residual and a result of the encoding.

20. A device of coding video data, the device comprising:
means for storing, in a first line buffer reserved in memory, a first palette token value of a first neighboring palette token to a current palette token of a palette token block of a current block in a first memory location of the first line buffer and configured to store a second palette token value of a second neighboring palette token to the current palette token of the palette token block of the current block in a second memory location of the first line buffer, wherein the first neighboring palette token and the second neighboring palette token are included in the palette token block and are adjacent to the current palette token in the palette token block;
means for storing, in a second line buffer reserved in the memory, a third palette token value of a third neighboring palette token to the current palette token of the palette token block of the current block in a third memory location of the second line buffer, wherein the third neighboring palette token is included in the palette token block and is adjacent to the current palette token in the palette token block, wherein the first palette token value, the second palette token value, and the third palette token value are each an index into a list of palette colors for a palette predictor block used for palette mode coding the current block;
means for determining a row or a column of the current palette token in the palette token block;
means for determining a first address for the first memory location in the first line buffer, a second address for the second memory location in the first line buffer, and a third address for the third memory location in the second line buffer based on the row or column of the current palette token value in the palette token block;
means for accessing the first palette token value from the first line buffer based on the first address, the second palette token value from the first line buffer based on the second address, and the third token value from the second line buffer based on the third address; and means for coding the current palette token value for the current palette token based on the first palette token value, the second palette token value, and the third palette token value.

21. A non-transitory computer-readable storage medium storing instructions thereon that when executed cause one or more processors to:
  store, in a first line buffer reserved in memory, a first palette token value of a first neighboring palette token to a current palette token of a palette token block of a current block in a first memory location of the first line buffer and configured to store a second palette token value of a second neighboring palette token to the current palette token of the palette token block of the current block in a second memory location of the first line buffer, wherein the first neighboring palette token and the second neighboring palette token are included in the palette token block and are adjacent to the current palette token in the palette token block;
  store, in a second line buffer reserved in the memory, a third palette token value of a third neighboring palette token to the current palette token of the palette token block of the current block in a third memory location of the second line buffer, wherein the third neighboring palette token is included in the palette token block and is adjacent to the current palette token in the palette token block, wherein the first palette token value, the second palette token value, and the third palette token value are each an index into a list of palette colors for a palette predictor block used for palette mode coding the current block;
  determine a row or a column of the current palette token in the palette token block;
  determine a first address for the first memory location in the first line buffer, a second address for the second memory location in the first line buffer, and a third address for the third memory location in the second line buffer based on the row or column of the current palette token value in the palette token block;
  access the first palette token value from the first line buffer based on the first address, the second palette token value from the first line buffer based on the second address, and the third token value from the second line buffer based on the third address; and
  code the current palette token value for the current palette token based on the first palette token value, the second palette token value, and the third palette token value.

22. An apparatus configured to code video data, the apparatus comprising:
  a first line buffer, reserved in memory, configured to store a first palette token value of a first neighboring palette token to a current palette token of a palette token block of a current block in a first memory location of the first line buffer and configured to store a second palette token value of a second neighboring palette token to the current palette token of the palette token block of the current block in a second memory location of the first line buffer, wherein the first neighboring palette token and the second neighboring palette token are included in the palette token block and are adjacent to the current palette token in the palette token block;
  a second line buffer, reserved in the memory, configured to store a third palette token value of a third neighboring palette token to the current palette token of the palette token block of the current block in a third memory location of the second line buffer, wherein the third neighboring palette token is included in the palette token block and is adjacent to the current palette token in the palette token block, wherein the first palette token value, the second palette token value, and the third palette token value are each an index into a list of palette colors for a palette predictor block used for palette mode coding the current block; and
  one or more processors implemented in circuitry and in communication with the first line buffer and the second line buffer, the one or more processors configured to:
    access the first palette token value and the second palette token value from the first line buffer and the third token value from the second line buffer;
    code a current palette token value for the current palette token based on the first palette token value, the second palette token value, and the third palette token value; and
    subsequent to accessing the first palette token value and the second palette token value from the first line buffer and the third token value from the second line buffer:
      store the first palette token value, stored in the first memory location of the first line buffer, into the third memory location of the second line buffer overwriting the third palette token value; and
      store a previous palette token value into the first memory location of the first line buffer overwriting the first palette token value.

23. The apparatus of claim 22, wherein the first line buffer includes a first plurality of memory locations that each correspond to a row or a column of the palette token block, and wherein the second line buffer includes a second plurality of memory locations that each correspond to the row or the column of the palette token block.

24. The apparatus of claim 22, wherein a number of memory locations in the first line buffer and the second line buffer is equal to a number of rows or columns of the palette token block that includes palette token values that are indices into the list of palette colors for the palette predictor block.

25. The apparatus of claim 22, wherein the one or more processors are configured to access the first palette token value and the second palette token value from the first line buffer and the third token value from the second line buffer in parallel with coding a previous palette token value.

26. The apparatus of claim 22, wherein to code, the one or more processors are configured to:
  determine one or more probability values for coding the current palette token value based on the first palette token value, the second palette token value, and the third palette token value; and
  code the current palette token value based on the determined one or more probability values.

27. The apparatus of claim 22, wherein to code, the one or more processors are configured to decode the current palette token, and wherein the one or more processors are further configured to:
  generate the palette predictor block based on the current palette token value, the first palette token value, the second palette token value, and the third palette token value;
  receive information indicative of a residual between the current block and the palette predictor block; and
  reconstruct the current block based on received information and the palette predictor block.

28. The apparatus of claim 27, further comprising a display configured to display the reconstructed current block.

29. The apparatus of claim 22, wherein the one or more processors are configured to:
generate the palette predictor block;
determine information indicative of a residual between the current block and the palette predictor block;
determine the current palette token value, the first palette token value, the second palette token value, and the third palette token value based on the palette predictor block, wherein to code, the one or more processors are configured to encode the current palette token value based on the first palette token value, the second palette token value, and the third palette token value; and
signal the information indicative of the residual and a result of the encoding.

30. The apparatus of claim 29, further comprising a camera configured to capture a picture that includes the current block.

31. The apparatus of claim 22, wherein the apparatus comprises one or more of a camera, a computer, a mobile device, a broadcast receiver device, or a set-top box.

* * * * *